US009356686B1

(12) United States Patent
Mitchell

(10) Patent No.: US 9,356,686 B1
(45) Date of Patent: May 31, 2016

(54) POLAR SATCOM SYSTEM AND RELATED METHOD

(71) Applicant: James P. Mitchell, Cedar Rapids, IA (US)

(72) Inventor: James P. Mitchell, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 131 days.

(21) Appl. No.: 14/137,302

(22) Filed: Dec. 20, 2013

(51) Int. Cl.
*H04B 7/185* (2006.01)

(52) U.S. Cl.
CPC .................... *H04B 7/18519* (2013.01)

(58) Field of Classification Search
USPC ............. 455/427–429, 7, 11.1, 12.1, 13.1, 15
See application file for complete search history.

(56) References Cited

U.S. PATENT DOCUMENTS

| | | | | |
|---|---|---|---|---|
| 5,129,095 A * | 7/1992 | Davis | ................. | H04B 7/18567 340/7.42 |
| 5,666,648 A * | 9/1997 | Stuart | ................... | H04B 7/195 342/352 |
| 5,678,175 A * | 10/1997 | Stuart | ................... | H04B 7/195 244/158.4 |
| 8,639,182 B2 * | 1/2014 | Moore, III | ......... | H04B 7/18521 455/13.2 |
| 2004/0157554 A1 * | 8/2004 | Wesel | ................ | H04B 7/18578 455/12.1 |
| 2005/0143005 A1 * | 6/2005 | Moore, III | ......... | H04B 7/18521 455/13.1 |
| 2008/0045146 A1 * | 2/2008 | Wahlberg | ........... | H04B 7/18573 455/12.1 |
| 2009/0053995 A1 * | 2/2009 | Moore, III | ......... | H04B 7/18521 455/13.1 |

* cited by examiner

*Primary Examiner* — Fayyaz Alam
(74) *Attorney, Agent, or Firm* — Angel N. Gerdzhikov; Donna P. Suchy; Daniel M. Barbieri

(57) ABSTRACT

A system and method for communication relay via a repeater platform satellite vehicle to a near surface station in the Polar Region is disclosed. A preferred embodiment receives a plurality of positioning and content data from a plurality of constellations of Geosynchronous Equatorial Orbit (GEO) Satellite Vehicles (SAT). Additionally, the system receives a plurality of position, time and altitude data from constellations of available repeater platform (RP) SATs. The system receives a request for content from a near surface station located in an area lacking adequate line-of-sight to the GEO based signal. The system aligns antenna elements onboard the desired RP SATs to amplify and relay the GEO based signal toward the near surface station and vice versa. Additionally, the system commands directional antenna elements onboard the station to send and receive the relayed signal making the GEO based content available to the near surface station.

20 Claims, 14 Drawing Sheets

POLAR SATCOM SYSTEM AND RELATED METHOD

GOVERNMENT CONTRACT INFORMATION

This invention was made with government support under United States of America subcontract No. NNA12AB82C awarded by NASA Comm 2050. The government has certain rights in the invention.

FIELD OF THE INVENTION

The present invention relates generally to satellite based communications. More particularly, embodiments of the present invention relate to a system and related method for efficient relay of communication signals from a first satellite in a geosynchronous orbit via a second satellite in a lower earth orbit to a station on the earth lacking acceptable line-of-sight to the first satellite.

BACKGROUND

Broadband Satellite Communication (SATCOM) in the polar regions of the world remains an elusive but increasingly necessary form of communication. Coverage is virtually non-existent with exception of some attempts used mostly for narrowband telemetry and geographical sensing. One problem with polar SATCOM may stem from the fact that Geosynchronous Equatorial Orbit (GEO) Satellite Vehicles (SAT) hosting broadband transponders do not have a line-of-sight within the Polar Regions (above/below approximately 70 degrees North/South earth latitude). Aircraft and ground stations within the Polar Regions (and other regions not having line of sight with a GEO SAT) requiring Radio Frequency (RF) contact with the remainder of the world are left without broadband options.

In addition, aircraft and stations may function with an operable antenna designed for reception of a GEO satellite signal. Such antennas may have limited reception angle for receiving the GEO based signal. For example, an aircraft may possess an antenna limited to a reception angle of +/−75 degrees from vertical. Any signal greater than 75 degrees from vertical may not be adequately received by the aircraft. Traditional antennas are usually bound by mechanical and physical limits from achieving 90 degrees (or below the horizon) pointing.

Traditional antenna structures may require significant mechanical positioning hardware to maintain function. Antenna positioning gimbals and motors required to physically point an antenna element in a specific direction add weight and power to an antenna structure. Such heavy antenna elements may be prohibitively heavy for cost effective launch and mechanically intensive for long term maintenance onboard satellite vehicles.

Satellite vehicles may possess additional payload and infrastructure beyond that for which the SAT may be designed. Such additional infrastructure may be available for communication elements falling within the specific constraints (size, weight, power) set out by the owner of the SAT.

The cost to launch a constellation of SATs for one specific purpose (e.g. communications with Polar Regions, other regions lacking line-of-sight with a GEO SAT) may be prohibitive. Therefore, those entities desirous of access to SAT infrastructure may combine a variety of elements onboard a single or already operational constellation of SAT.

Some attempts at Polar Region communication via SATs lack the desired bandwidth and/or find limited operational success. Some of these traditional attempts may describe a radio receiver/transmitter onboard a Low Earth Orbit (LEO), Medium Earth Orbit (MEO) and High Earth Orbit (HEO) SAT. Such a radio receiver/transmitter requires a processor intensive demodulation of the received signal straining the limited processing capability and power available onboard the SAT. With the demodulation requirements also comes limited bandwidth capability.

Additional communication attempts may be limited by pure geometry. The attempts provide less than a full coverage of the Polar Regions. The limitations of these attempts may stem from inadequate geometry coverage since they use a low altitude satellite incapable of the geometry required for full Polar Region coverage.

Therefore, a need remains for a satellite based system and related method for successful satellite vehicle based relay of a signal between a GEO satellite vehicle and a transceiver located in the region lacking GEO signal coverage.

SUMMARY

Accordingly, one embodiment of the present invention is directed to a method for communication relay via a repeater platform satellite vehicle, comprising: receiving Geosynchronous Equatorial Orbit (GEO) satellite vehicle (SAT) positioning data, the GEO SAT positioning data representative of a position of at least one GEO SAT, receiving a GEO SAT service type associated with the at least one GEO SAT, the GEO SAT service type an identifier of a type of data service provided by the at least one GEO SAT, receiving repeater platform (RP) satellite vehicle (SAT) positioning data, the RP SAT positioning data representative of a position, time and velocity of at least one RP SAT, receiving a service request for the GEO SAT service type to at least one station, determining at least one desired GEO SAT of the at least one GEO SAT, the determining based on the service request, the RP SAT positioning data and the GEO SAT positioning data, directing an RP SAT antenna system to communicate with the at least one desired GEO SAT via a GEO signal, directing the RP SAT antenna system to communicate with the at least one station via a RP signal, the RP signal a substantial reproduction of the GEO signal, amplifying the GEO signal and the RP signal, the amplifying without demodulation of: the GEO signal and the RP signal, the amplifying powered by a RP SAT power source, dynamically updating the directing of the RP SAT antenna system based on the GEO SAT positioning data and the RP SAT positioning data.

An additional embodiment of the present invention may include a method wherein the GEO SAT is at least one of a plurality of GEO SATs in communication with at least one ground station and the RP SAT is at least one of: a Low Earth Orbit (LEO) SAT, a Medium Earth Orbit (MEO) SAT, a Highly Elliptical Orbit (HEO) SAT and a SAT more distant from the earth than the LEO SAT.

An additional embodiment of the present invention may include a method wherein the RP SAT antenna system and a station antenna are an Electronically Steerable Array (ESA) antenna and the service request further includes station positioning data, the station positioning data representative of a position and velocity of a station.

An additional embodiment of the present invention may include a method wherein directing the RP SAT antenna system further comprises: directing at least one RP SAT GEO link antenna to communicate via the GEO signal, the GEO signal between the RP SAT GEO link antenna and the at least one desired GEO SAT, the directing based on the RP SAT positioning data and the GEO SAT positioning data, the RP SAT GEO link antenna located on the at least one RP SAT, directing at least one RP SAT ground link antenna to communicate via at least one RP signal between the RP SAT ground link antenna and at least one station, the directing based on the RP SAT positioning data and the station positioning data, the RP SAT ground link antenna located on the at least one RP SAT.

An additional embodiment of the present invention may include a method further comprising: directing at least one station antenna to communicate via the at least one RP signal between the station antenna and the at least one RP SAT ground link antenna, the directing based on the RP SAT positioning data and the station positioning data, the at least one station antenna located proximal to the at least one station.

An additional embodiment of the present invention may include a method wherein one of the at least one desired GEO SAT is configured for one of: internet data, streaming data and positioning data and is of a different service type from another of the at least one desired GEO SAT and wherein the RP SAT GEO link antenna and the RP SAT ground link antenna are a single ESA configured for multiple beam transmission and reception between the RP SAT and the GEO SAT and between the RP SAT and the station.

An additional embodiment of the present invention may include a method wherein directing the at least one RP SAT GEO link and ground link antennas further comprises electrically steering a beam in at least one of: reception and transmission to receive and transmit at least one of: the GEO signal and the RP signal and dynamically updating the directing of the RP SAT antenna system, based on the GEO SAT positioning data further comprises receiving updated positioning data from the at least one GEO SAT and the at least one RP SAT.

An additional embodiment of the present invention may include a method wherein directing the RP SAT antenna system and further comprises a control signal received from a remote location via at least one of: wired, optical and wireless transmission.

An additional embodiment of the present invention may include a system for communication relay via a repeater platform satellite vehicle, comprising: at least one Repeater Platform (RP) Satellite Vehicle (SAT) antenna system configured for bidirectional communication with at least one Geosynchronous Equatorial Orbit (GEO) Satellite Vehicle (SAT), the bidirectional communication via at least one GEO signal, the RP SAT antenna system located onboard a RP SAT, the at least one GEO signal between the at least one RP SAT GEO link antenna and the at least one GEO SAT, the RP SAT antenna system further configured for bidirectional communication with at least one station, the station not within adequate line-of-sight of the at least one GEO SAT, the bidirectional communication via at least one RP signal, the at least one RP signal a substantial reproduction of the at least one GEO signal, a RP SAT amplifier system, the RP SAT amplifier system receiving power from the RP SAT, the RP SAT amplifier system configured for amplifying the at least one GEO signal and the at least one RP signal, the amplifying without demodulation of: the at least one GEO signal and the at least one RP signal, the RP SAT amplifier system located onboard the RP SAT, a controller configured for: receiving Geosynchronous Equatorial Orbit (GEO) satellite vehicle (SAT) positioning data, the GEO SAT positioning data representative of a position of at least one GEO SAT, receiving a GEO SAT service type associated with the at least one GEO SAT, the GEO SAT service type an identifier of a type of data service provided by the at least one GEO SAT, receiving RP SAT positioning data, the RP SAT positioning data representative of a position and velocity of at least one RP SAT, receiving a service request for the GEO SAT service type to at least one station, determining at least one desired GEO SAT of the at least one GEO SAT, the determining based on the service request, the RP SAT positioning data and the GEO SAT positioning data, directing the RP SAT antenna system to communicate via the at least one GEO signal, the directing based on the RP SAT positioning data and the GEO SAT positioning data, directing the RP SAT antenna system to communicate via the at least one RP signal between the RP SAT ground link antenna and at least one station, the directing based on the RP SAT positioning data and the station positioning data, dynamically updating the directing of the RP SAT antenna system based on the GEO SAT positioning data and the RP SAT positioning data, and a communication link between the controller and: the RP SAT antenna system, the communication link for receiving signals representative of positioning data from: the at least one GEO SAT, the at least one RP SAT and the station, the communication link for sending signals representative of directing the RP SAT antenna system to communicate with the GEO SAT and with the station.

An additional embodiment of the present invention may include a non-transitory computer readable medium having non-transitory computer readable program code embodied therein for communication relay via a repeater platform satellite vehicle, the computer readable program code comprising instructions which, when executed by a computer device or processor, perform and direct the steps of: receiving Geosynchronous Equatorial Orbit (GEO) satellite vehicle (SAT) positioning data, the GEO SAT positioning data representative of a position of at least one GEO SAT, receiving a GEO SAT service type associated with the at least one GEO SAT, the GEO SAT service type an identifier of a type of data service provided by the at least one GEO SAT, receiving repeater platform (RP) satellite vehicle (SAT) positioning data, the RP SAT positioning data representative of a position, time and velocity of at least one RP SAT, receiving a service request for the GEO SAT service type to at least one station, determining at least one desired GEO SAT of the at least one GEO SAT, the determining based on the service request, the RP SAT positioning data and the GEO SAT positioning data, directing an RP SAT antenna system to communicate with the at least one desired GEO SAT via a GEO signal, directing the RP SAT antenna system to communicate with the at least one station via a RP signal, the RP signal a substantial reproduction of the GEO signal, amplifying the GEO signal and the RP signal, the amplifying without demodulation of: the GEO signal and the RP signal, the amplifying powered by a RP SAT power source, dynamically updating the directing of the RP SAT antenna system based on the GEO SAT positioning data and the RP SAT positioning data.

An additional embodiment of the present invention may include a method for communication relay via a repeater platform satellite vehicle, comprising: means for receiving Geosynchronous Equatorial Orbit (GEO) satellite vehicle (SAT) positioning data, the GEO SAT positioning data representative of a position of at least one GEO SAT, means for receiving a GEO SAT service type associated with the at least one GEO SAT, the GEO SAT service type an identifier of a type of data service provided by the at least one GEO SAT, means for receiving repeater platform (RP) satellite vehicle (SAT) positioning data, the RP SAT positioning data representative of a position, time and velocity of at least one RP SAT, means for receiving a service request for the GEO SAT service type to at least one station, means for determining at least one desired GEO SAT of the at least one GEO SAT, means for directing an RP SAT antenna system to communicate with the at least one desired GEO SAT, means for directing the RP SAT antenna system to communicate with the at least one station, the RP signal a substantial reproduction of the GEO signal, means for amplifying the GEO signal and the RP signal, the amplifying without demodulation of: the GEO signal and the RP signal, means for dynamically updating the directing of the RP SAT antenna system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Figure 1:
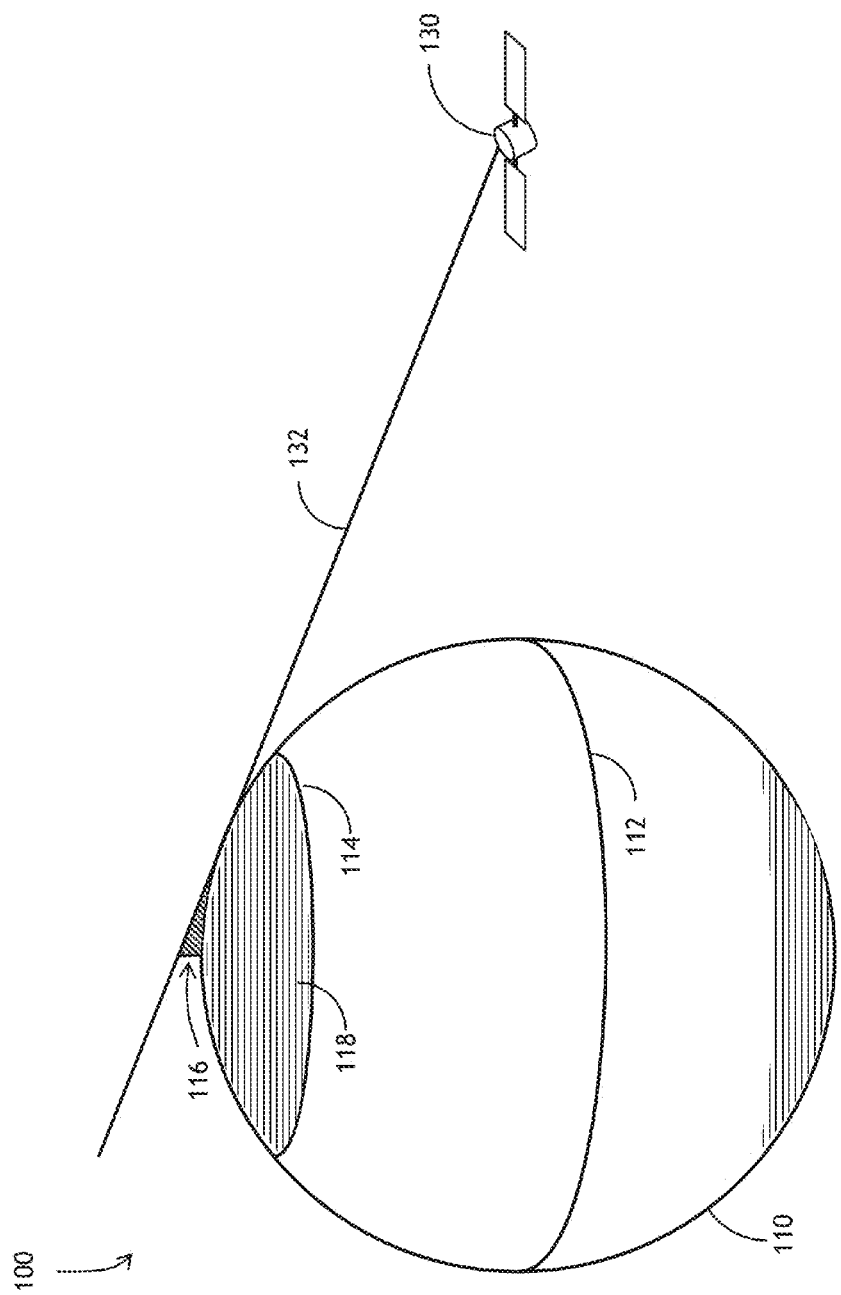
FIG. 1 is a diagram of earth geometry related to a GEO satellite vehicle in accordance with an embodiment of the present invention.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention may be directed to a system and method for relaying (repeating) a GEO signal to/from a station located in an area with limited line-of-sight with a GEO SAT. In one embodiment, a signal may be directionally transmitted from a ground station located, for example, at 40 degrees north latitude and received by a GEO SAT in orbit above the 40 North ground station. The signal may be directionally transmitted by the GEO SAT to a Repeater Platform (RP) SAT located in an area with desirable line of sight to the region lacking acceptable line-of-sight with a GEO SAT. A signal very closely resembling that transmitted by the GEO SAT may then be directionally relayed by the RP SAT to the station located in the remote region lacking acceptable line-of-sight with the GEO SAT (e.g. a Polar Region).

Embodiments of the present invention may employ specialized antenna elements possessing a small form factor, requiring specific limited power, and capable of directional transmit/receive based on antenna properties. For example, an Electrically Steerable Array (ESA) antenna including a static flat panel array of amplifier elements, when excited in a certain phased manner, will produce an antenna response (beam of transmission) focused in a specific direction.

Embodiments of the present invention may employ this antenna response to direct the signal between the GEO SAT and the surface/air station in located in the remote area. The pure signal repeating requires little processing power and electrical power from the RP SAT on which it is mounted.

A ground station receiving the repeated signal may be unaware that the received signal is repeated from the RP SAT 140. Embodiments of the present invention may repeat the GEO signal in the exact frequency and bandwidth possessed by the signal transmitted from the GEO SAT. For example, a station in the Polar Regions desiring a broadband video signal from a GEO SAT may request service from the provider of the GEO SAT maintaining the desired signal. The systems herein may align one or more antenna elements onboard the RP SAT to repeat and amplify the desired GEO signal from GEO SAT to the station.

Embodiments of the present invention may provide a system with zero interference between a signal transmitted by a GEO SAT and a signal repeated by the RP SAT mounted repeater antenna. Geometry of the two identical signals (the first signal transmitted by the GEO SAT and the second signal repeated from the RP SAT) is nearly orthogonal leading the ground/air station in the remote region to easily distinguish between the two signals if the station were to periodically receive the GEO signal. Additionally, as viewed from the station in the remote region, the GEO SATs may be below the horizon eliminating interference between the GEO signal and the RP signal.

It is contemplated herein; embodiments of the present invention may deliver a broadband signal of an exemplary 100 plus Megabits per Second (Mbps) to the remote regions since the repeater aspect of the present invention is not limited by bandwidth. The entirety of the GEO signal is available to the station within the remote region.

As used herein, the term Polar Region may describe any region where adequate line-of-sight may not exist between the station desiring SATCOM and the GEO SAT constellations providing the desired signal. Examples may include north sides of mountains in the northern hemisphere as well as south sides of buildings in the southern hemisphere.

Embodiments of the present invention may employ minimally sized RP SAT hardware to relay broadband communications from desired GEO SAT assets via proximal RP SAT satellites to the near earth station in remote areas. The concept suggests capture of a GEO signal global beam "overscan" using a continuum of orbiting RP SAT assets in one or more orbital planes. The RP SAT may include directional antenna elements and a repeating RF transponder to relay the GEO signal to the area lacking adequate line-of-sight with the GEO SAT.

The RP SAT(s) engaged with the GEO SAT(s) may include RP SAT assets at or near zenith over the polar area. As the RP SATs orbit, the function of relaying the band to the remote area is switched from one RP SAT to the following RP SAT and so on. The primary RP SAT antenna may be comprised of ESA antenna technology enabling a fixed antenna panel to be employed to electronically steer the tx/rx beam to the GEO satellite and the remote station without requiring moving parts or mechanical gimbals. Due to the proximity and geometry of the satellites and air or ground users, the RF band may be repeated (amplified, filtered and boosted) and directed down/upward from a secondary RP SAT ESA to a fixed or mobile user terminal ESA without interference to the host GEO satellite or its ground operations.

The RP SAT may be one from a set of existing or planned commercial satellites allowing host payloads in addition to the primary mission of the RP SAT (e.g., the present invention may be integrated onto polar communications satellites having the necessary power bus and spacecraft systems). Additionally the desired RP SAT may preferably orbit at altitudes of about 450 miles or greater to have simultaneous and continuous visibility to the host GEO satellite and the polar ground area.

Embodiments of the present invention may preferably employ a flat panel ESA antenna onboard the RP SAT to actively direct beam(s) to desired GEO SATs in given orbital positions based on satellite positioning data, time and updates without requiring cumbersome mechanical gimbals.

Embodiments of the present invention may employ existing RP SATs to host the GEO to station repeater payload to make the concept more fiscally viable. In using the small GEO SAT overscan, embodiments herein may be able to provide enough link margin to excite a RF repeater or a more deliberately engineered beam from a GEO in the direction of the remote area. The present invention RF "repeater" (GEO RF band) on the RP SAT may be a simple solution which requires no bandwidth reducing RF terminal regenerative systems.

FIG. 1

Referring to FIG. 1, a diagram of earth geometry related to a GEO satellite vehicle in accordance with an embodiment of the present invention is shown. Earth surface 110 may be the communications barrier between GEO SAT 130 and a station in the polar region 118. Line of sight 132 of GEO SAT 130 may produce a blind area 116 in the polar region 118.

In addition, as stations move farther from the equator 112, and above/below a remote latitude 114, antennas onboard stations may be unable to receive the GEO signal based on limited graze angle of the station antenna.

FIG. 2

Figure 2:
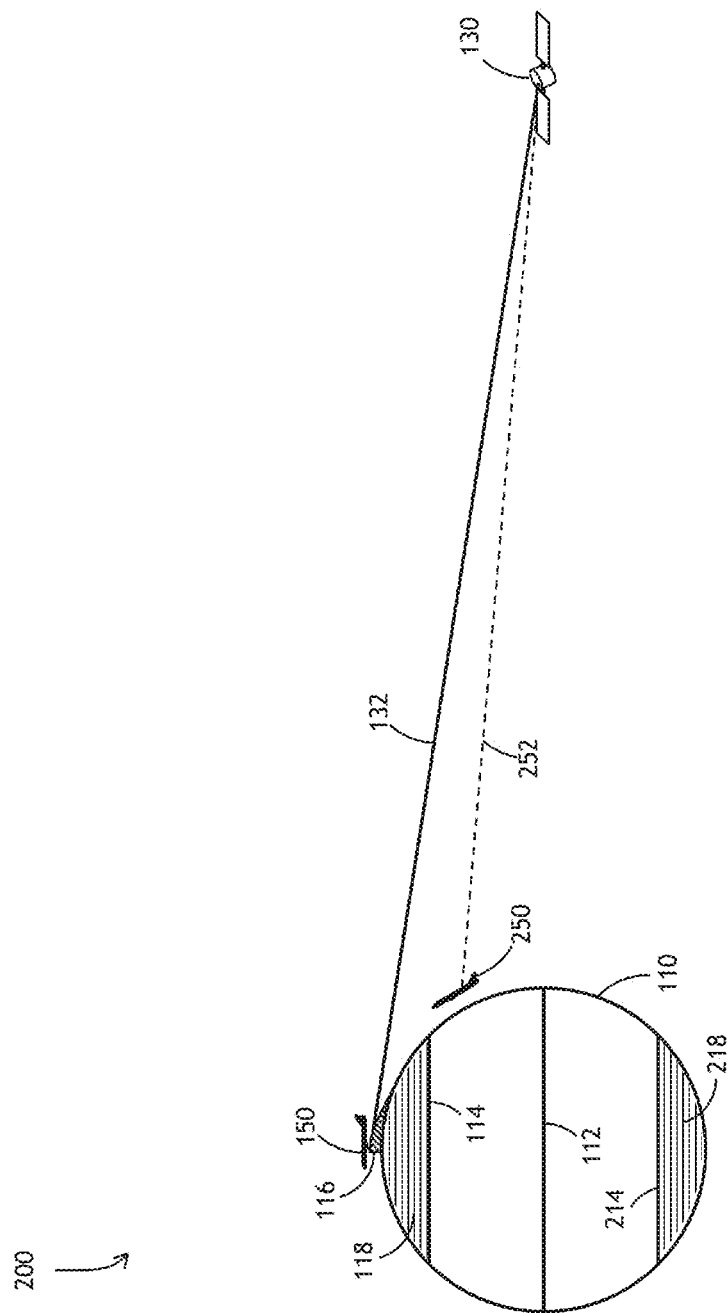
FIG. 2 is a diagram of earth geometry related to a GEO satellite vehicle in accordance with an embodiment of the present invention.

Referring to FIG. 2, a diagram of earth geometry related to a GEO satellite vehicle in accordance with an embodiment of the present invention is shown. A remote airborne station 150 airborne over one remote area may be desirous of communication with GEO SAT 130. Unlike tropical airborne station 250 with associated line-of-sight 252, remote airborne station 150 is unable to communicate with GEO SAT 130 due to the geometry of the line-of-sight 132.

Embodiments of the present invention may provide communication between GEO SAT 130 and stations in remote areas. In one embodiment, systems herein may provide communications to stations located Polar Regions north 118 and south 218 bounded by remote latitude north 114 and south 214.

FIG. 3

Figure 3:
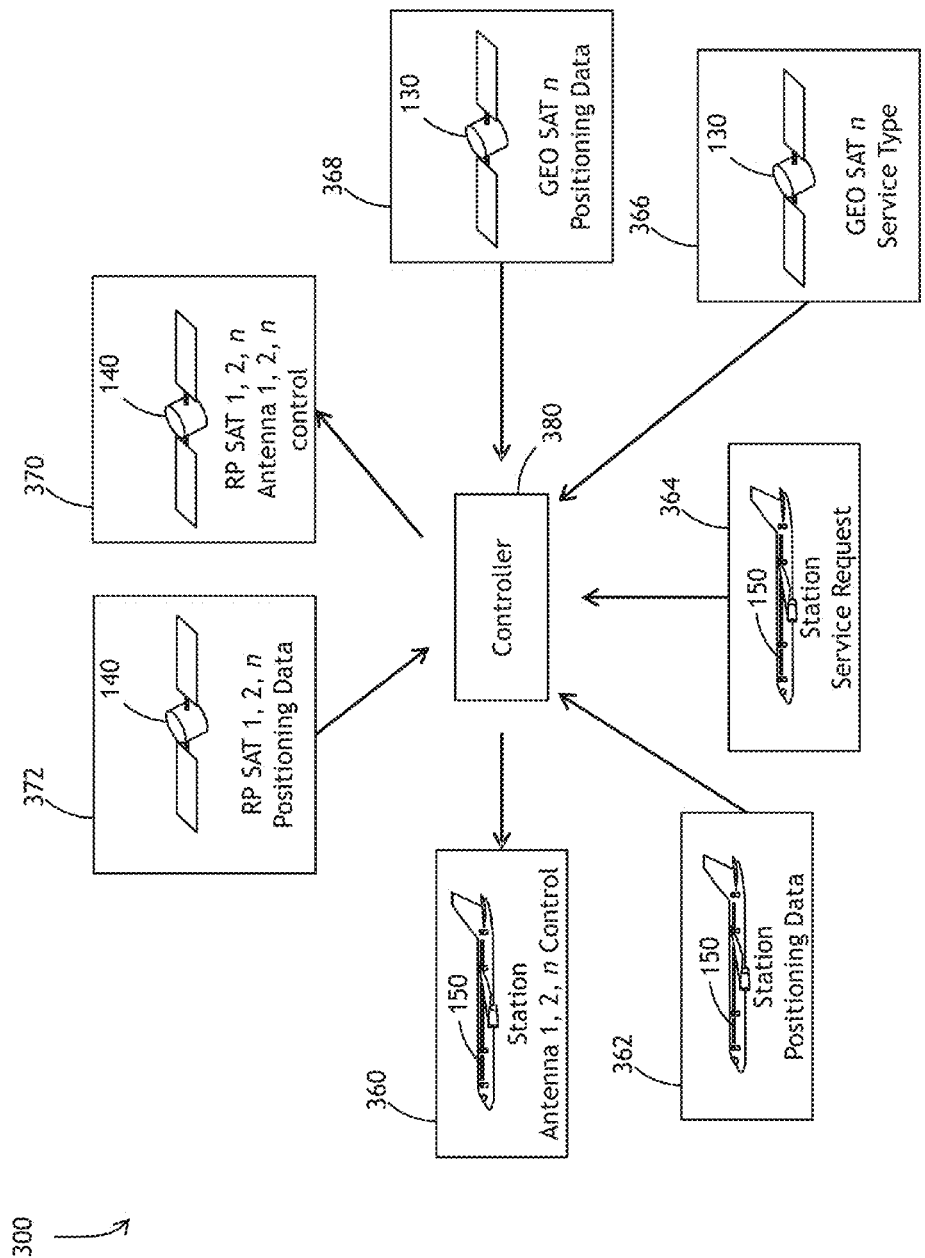
FIG. 3 is a diagram of exemplary variables in accordance with an embodiment of the present invention.

Referring to FIG. 3, a diagram of exemplary variables in accordance with an embodiment of the present invention is shown. System 300 may provide communication to remote regions based on a plurality of data received and, based on the data, direct antenna elements onboard RP SAT to enable communication therein.

Based on the station position, system 300 may optionally receive the station positioning data 362 to enable station antenna 152 to direct toward an RP SAT. Station positioning data 360 may comprise location of the station plus a velocity vector of the station should the station be mobile. Altitude, heading, speed and position may be some examples of station positioning data 362. It is contemplated system 300 may enable communication using latitude longitude, grid based coordinates and the like to accurately indicate position of station 150.

Also, a predicted location and time may be included in the station positioning data 362. For example, an underwater station may desire communication at a specific time and location when the underwater station may come to the surface. System 300 may accept the predictive station positioning data 362 and provide communication at the desired time and location.

System 300 may receive a station service request 364. The station service requires may include a type of data the station desires to send/receive. For example, station 150 may request delivery of internet data and streaming data to/from the user terminal aboard station 150 from GEO network service. Such request may include any service type available via the GEO signal. Specifically, system 300 may be configured for delivery of broadband data communication to the station based on the service request 364.

System 300 may maintain a list of GEO SAT service types 366 from which to draw a data path. For example, one GEO SAT may offer broadband data while another GEO SAT may offer broadband voice or video. Along with the type of data offered by the GEO SATs, system 300 may maintain the GEO SAT positioning data 368 of each of the GEO SATs available for use.

System 300 may receive RP SAT positioning data 372 to determine which RP SAT it may use for repeating the GEO signal. From these inputs, system 300 may employ controller 380 to determine the required parameters for remote communication. In order of station 150 to communicate with the RP SAT, station antenna elements need to be directed toward the RP SAT location at the roper time. Controller 380 may send directive commands to station antenna elements to direct them in the proper direction.

Onboard RP SAT 140, antenna elements 370 may be directed to both the station 150 and GEO SAT 130 for proper communication. System 300 controller 380 may send a signal to one or more antenna elements onboard RP SAT 140 to direct the antenna elements toward the proper signal source/destination.

In one embodiment, controller 380 may reside onboard RP SAT and be powered by RP SAT onboard system. For example, system 300 may reside completely onboard RP SAT drawing power from RP SAT power sources and capable of effecting GEO signal and RP signal directional communication between GO SAT and the station.

In additional embodiments, controller 380 may be surface based and control antenna direction remotely via a communication link with each of the system 300 antenna. For example, controller 380 may reside in a ground station with relatively unlimited power and bandwidth recourses from which to draw. Controller 380 may receive information concerning the GEO SAT constellations, the RP SAT constellations and the stations requesting service from the GEO SATs. Controller 380 may then remotely direct the plurality of antenna systems to deliver GEO SAT content to the requesting station.

In another exemplary embodiment, controller 380 may reside onboard station 350 150 and communicate directly with any of the RP SATs in view. The station based controller 380 may send the communication link signals to RP SAT antenna system to direct the RP SAT antenna system to the desired GEO SAT for desired GEO SAT content.

Alternatively, system 300 may require very little control for successful operation. For example, a user may desire specific content from a specific constellation of GEO SATs and agree with the desired GEO SAT constellation operator and a desired RP SAT constellation operator to provide constant service within a specific area. RP SAT antenna system onboard one or more of the RP SATs within a constellation may be directed to continuously communicate via the GEO signal with at least one GEO SAT from the specific desired constellation and direct the RP signal to the specific area. For example, a specific area located on the north side of a mountain in Chile may request a continuous RP signal from one GEO constellation. RP SAT antenna system would be continuously directed at one of the desired GEO SATs and continuously illuminate the area with a RP signal. In this manner each successive RP SAT approaching the area may be tasked to assume the repeating duties as it flies proximal to the area.

Exemplary data paths from which system 300 may draw data may be best described in applicant's earlier work embodied in U.S. Pat. No. 8,176,520 B1 entitled "Communication system and method for a mobile platform" filed 28 Jan., 2000 which is hereby incorporated herein by reference in its entirety.

FIG. 4

Figure 4:
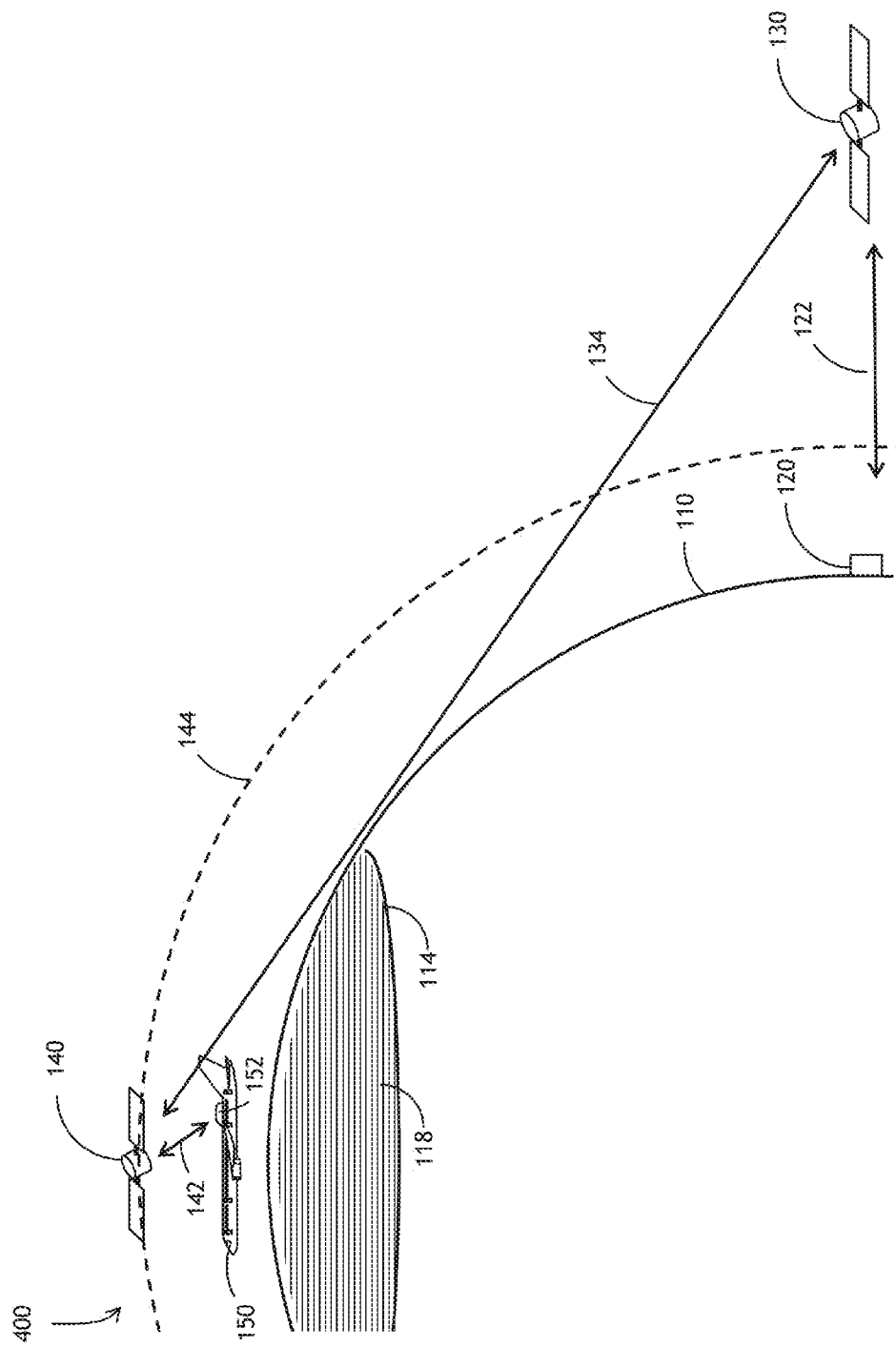
FIG. 4 is an diagram of geometry associated with one embodiment of the present invention.

Referring to FIG. 4, a diagram of geometry associated with one embodiment of the present invention is shown. GEO SAT 130 may be nearly stationary in its GEO above the equator 112. Ground station 120 may be configured to send and receive a ground signal 122 between ground station 120 and GEO SAT 130.

In addition, a plurality of GEO SATs may be co-joined with a ground network (e.g., wired or fiber) infrastructure. System 300 may be specifically configured to function within the framework of the ground network. For example, Controller 380 may operate within a shared network operation center so that an aircraft stations 150 receiving wither the direct signal 254 or the RP signal 542 may instantly switch from a first GEO SAT to a second GEO SAT while maintaining the same data session and service. The session may be transferred between satellites via a communication link with the ground network infrastructure.

RP SAT 140 may comprise a plurality of constellations of SATs in a plurality of variable orbits. RP SAT orbit 144 may be one example of an exemplary orbit usable by system 300 for Polar SATCOM. Such RP SAT orbit 144 may be one which extends over each of the north and south poles enabling system 300 to offer line-of-sight communication to stations 150 in the Polar Regions 118.

In some embodiments, the station antenna 152 may be directed toward the general vicinity of the RP SAT 140 to accurately receive RP signal 142. Station antenna 152 (here, on an aircraft) may have a number of options of accurate directional control and maintenance/dynamically updating directional control. One option may include a scanning mode to search overhead for the RP signal 142. This process may have advantages considering a passive nature of the scan. A station 150 may be able to purely receive the RP signal 142 without revealing the station location through a control signal transmission. This scanning mode however, may require more time to acquire the RP signal 142 since the station 150 may be required to wait for the next RP SAT to become visible overhead.

An additional passive option may include a known RP SAT 140 location. System 300 may employ well-known time sync operations (such as Global Positioning System (GPS) time sync) and an algorithm based on known satellite ephemeris data to determine the direction to which system 300 will direct the station antenna 152. Should station 150 be in motion, system 300 may accommodate for the vector and position change in the determination of station antenna 152 direction.

An additional option may include a known station 150 location enabling system 300 to direct RP SAT 140 antennas (and associated beams thereof) toward station 150. This known station location option may enable immediate communication between station 150 and RP SAT 140 however, station location may be broadcast leading to possible sensitive data being compromised.

FIG. 5

Figure 5:
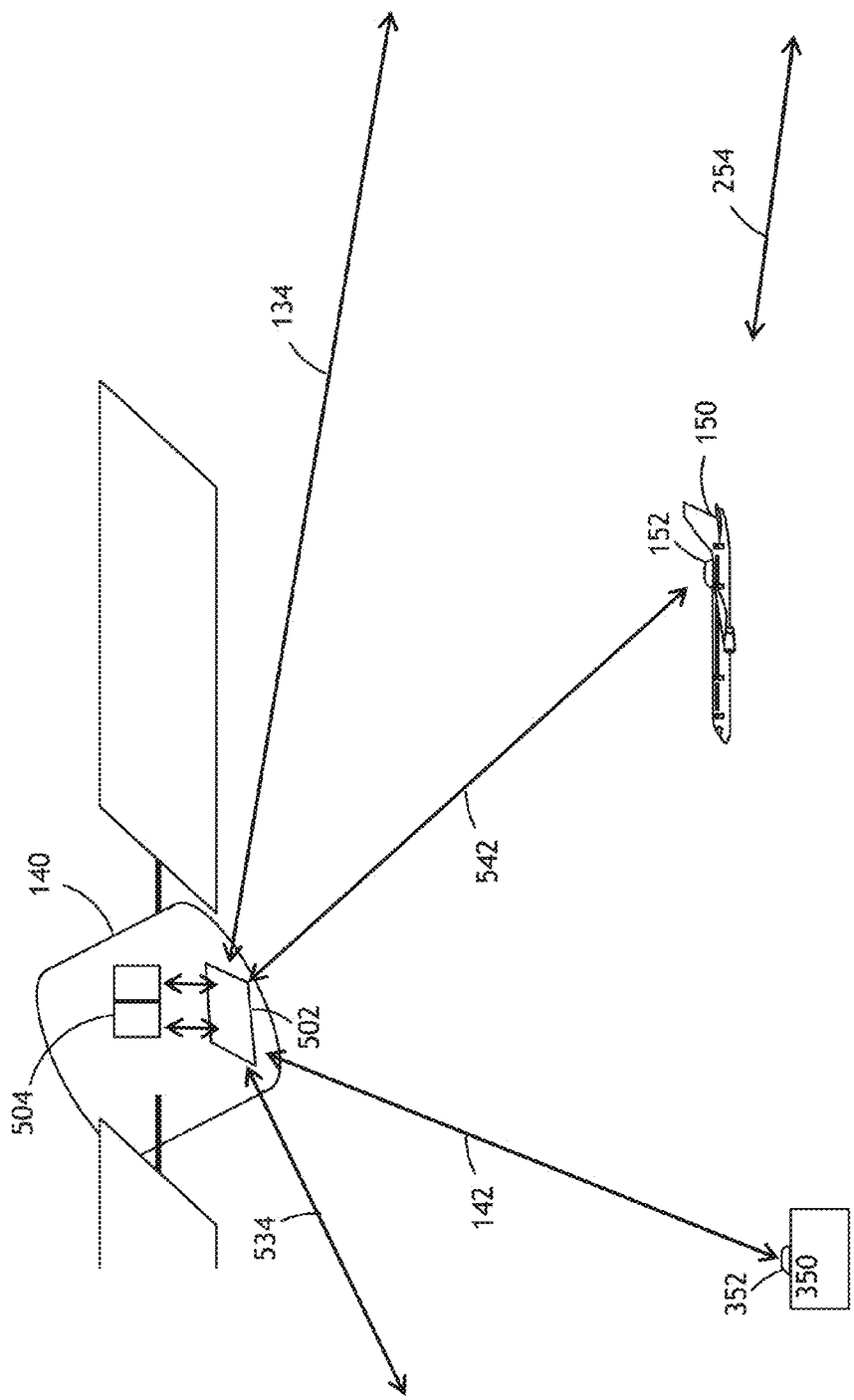
FIG. 5 is a diagram of exemplary components onboard a satellite vehicle in accordance with one embodiment of the present invention.

Referring to FIG. 5, a diagram of exemplary components onboard a satellite vehicle in accordance with one embodiment of the present invention is shown. Preferably, system 500 may include RP SAT antenna system 502 comprised of antenna, amplifiers 504 and an onboard power source. In one embodiment RP SAT antenna system 502 comprises a single ESA antenna element configured for communication with GEO SAT 130 and stations 150 350.

RP SAT antenna system 502 may be configured with frequency agility to enable a reception on a first frequency followed by a transmission on a second frequency within a single antenna. For example, in one embodiment a well-known mixer may be employed to produce a signal of discriminating frequency from the frequency received. In one exemplary scenario, a GEO signal of 12.5 GHz may provide communication between GEO SAT and RP SAT. As system 300 may communicate between RP SAT and the station at an exemplary 10 GHz. Variable antenna size may produce the desired RP signal at the desired power reaching the station.

System 300 may include station antenna 152 elements configured for near immediate transfer from a direct signal 254 along line-of-sight 252 from the GEO SAT to the RP signal 542 from the RP SAT. For example, an aircraft station 150 flying due north from New York may directly receive the direct GEO signal 254 from the GEO SAT 130. As the aircraft station 150 travels north, it will eventually lose the ability to directly communicate with GEO SAT 130 via direct signal 254. At this point before communication is lost, controller 380 may direct station antenna 152 to transfer the transmission reception from GEO signal 254 to RP signal 542. In this manner, there is no gap in coverage for station 150 reception and transmission with desired GEO SAT 130.

Similar to a well-known cross band repeater, system 300 may transmit the RP signal on a slightly different frequency from the RP SAT antenna system to preclude interference between the RP signal and the GEO signal.

In addition, where station may be in an area where GEO signal may be intermittently present, system 300 may compensate for possible interference between GEO signal and RP signal via frequency agility of the RP antenna system. System 300 may receive and transmit in different frequency bands. System 300 may remain active outside the Polar Regions as long as it may use a band non-interfering with the local GEO sat bands.

Embodiments of the present invention may be assisted by applicants work in U.S. Pat. No. 6,741,841 B1 filed Jan. 28, 2000 entitled "Dual receiver for an on-board entertainment system which is incorporated by reference herein in its entirety.

FIG. 6

Figure 6:
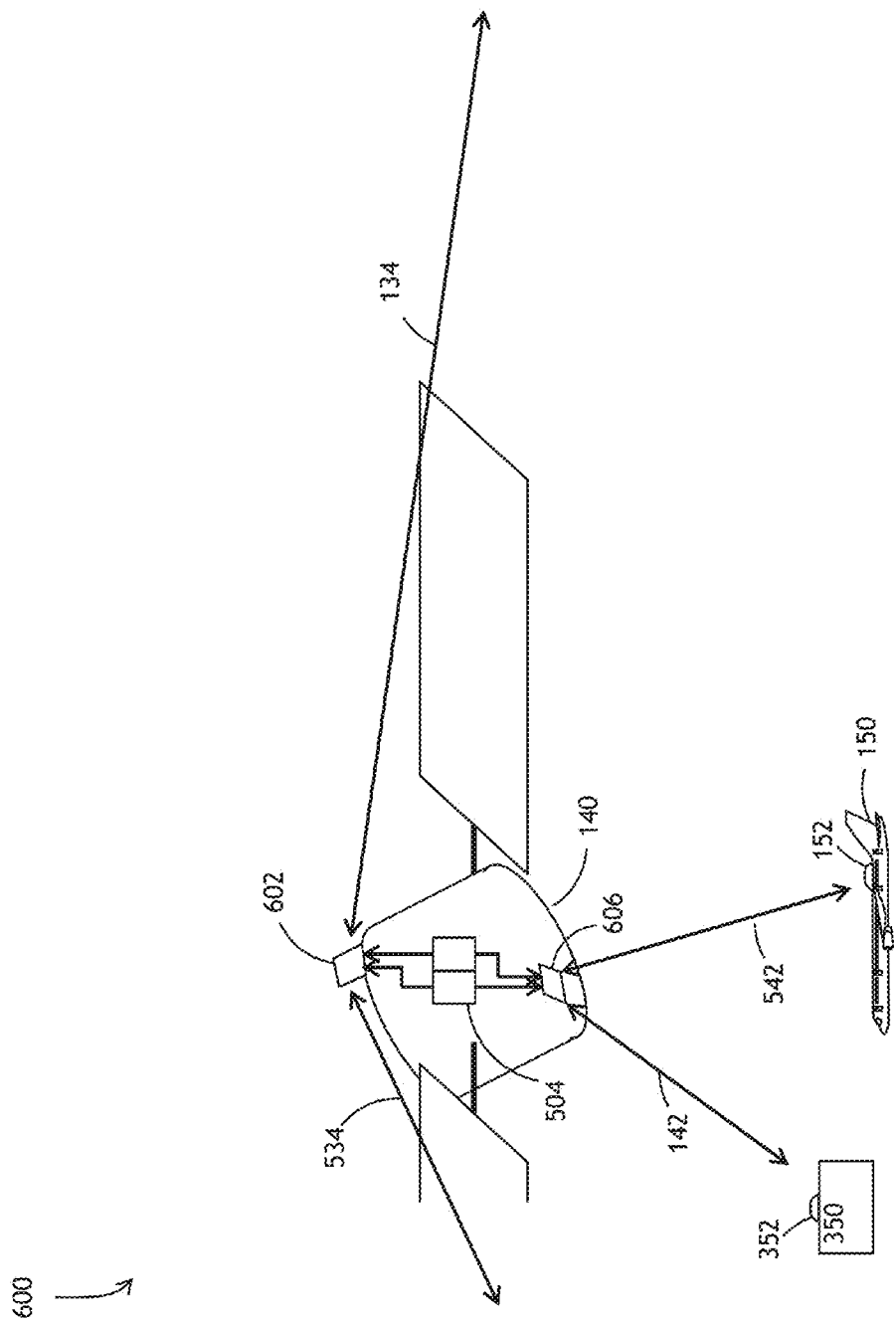
FIG. 6 is a diagram of exemplary alternate components onboard a satellite vehicle in accordance with one embodiment of the present invention.

Referring to FIG. 6, a diagram of exemplary alternate components onboard a satellite vehicle in accordance with one embodiment of the present invention is shown. A physical separation between RP SAT antenna elements may provide system 300 with additional frequency agility enabling system 300 to optionally transmit and receive within a single frequency band. System 600 onboard the RP SAT 140 is configured with one or more antenna elements to accomplish the reception and transmission of the communication signal. In one embodiment, RP SAT antenna elements are ESA antennas configured for accurate directional communications via beam steering without mechanical movement.

RP SAT GEO link antenna 602 may be configured for sending and receiving signals from a plurality of SATs. In one embodiment, a single RP SAT GEO link antenna 602 is configured for transmission and reception to and from one or more GEO SATs. In additional embodiments, multiple RP SAT GEO link antenna elements are positioned around the RP SAT 140 for optimum line-of-sight transmission and reception from the desired GEO SATs. In one embodiment, longitudinally oppositely located RP SAT GEO link antenna ESA elements may provide signal reception in a direction of travel of the RP SAT as well as in a direction opposite the direction of travel.

As RP SAT 140 continues in orbit, different GEO SATs may come into view allowing near instantaneous transfer between the desired GEO SAT supplying the communication conduit. For example, RP SAT GEO link antenna may be in communication with a first GEO SAT 130 via GEO signal 134. As a second GEO SAT may come into view, RP SAT GEO link antenna 602 may transfer to the second GEO SAT via GEO signal 534 for continuous communication.

Further, RP SAT GEO link antenna 602 may provide capability for multiple directional beams within the phased array simultaneously access content from a plurality of GEO signals. For example, RP SAT 140 may have line-of-sight to more than one GEO SAT 130 at one time. System 500 may enable RP SAT GEO link antenna 602 to directionally communicate via GEO signal 134 from a first GEO SAT while simultaneously directionally receiving second GEO signal 534 from a second GEO SAT.

Additionally, once the GEO signals 134 534 are received by the RP SAT GEO link antenna 602, system 500 may amplify the signal via RP amplifiers 504 for transmission to one or more of the stations 150 350 via RP SAT ground link antenna 606 and RP signals 142 542. It is contemplated the plurality of GEO signals may be repeated to a plurality of stations not limited by number. For example, station 150 may require content from four GEO SATs while station 350 may require content from only one or two. In this manner, system 500 may enable simultaneous reception of a plurality of GEO signals 134 534, amplify and directionally repeat the signals via RP SAT ground link antenna 606 and RP signals 142 542 to the plurality of stations 150 350. In one embodiment, dual amplifiers may comprise RP amplifier 504; one amplifier for the GEO to Station signal path and a separate amplifier for the station to GEO signal path.

System 300 may provide specialized content based on the service type provided by desired GEO SAT 130. For example, on constellation may transmit a bi-directional signal enabling two-way broadband internet data type of exchange to an unlimited number of users. System 300 may provide a one-way signal more akin to broadcast TV. For example, in some situations, station 150 may desire reception only of the desired GEO signal. In this case, system 300 may enable a single direction of data transfer from GEO SAT through RP SAT to the station. In addition, some stations 150 may desire a limited amount of data available to a user within station 150. In this case, station 150 may enable specific decoders available to configure the full signal for a partial use.

In addition, digital communications with an air traffic control or flight following facility may be desired by station 150. In one embodiment, Controller Pilot Data Link Communications (CPDLC) may be enabled through the GEO signals and RP signals herein.

System 500 may use frequency discrimination to maintain the separate signals. For example, GEO signal 134 may be exemplary transmitting in the Ku frequency band while GEO signals 534 may be exemplary transmitting in the Ka band. System 500 may repeat these signals via RP SAT ground link antenna 606 to the stations 150 350 desiring such communication.

As RP SAT 140 continues on its orbit, system 500 may continuously and dynamically update RP SAT GEO link antenna 602 beam to be directed at the desired GEO SATs. As the GEO SATs are relatively stationary, system 500 may dynamically update the RP SAT GEO link antenna to be directed at the desired GEO SATs.

In addition, stations 150 350 may provide a future location vector input for system 500 to enable immediate and accurate directional transmission and reception at the future time. System 500 may continuously and dynamically direct RP SAT ground link antenna 606 toward the desired stations 150 350 at the appropriate time for immediate reception of the RP signals 142 542.

In one embodiment, the system 500 may comprise control of three antennas. The two ESA elements 502 506 on board the RP SAT 140 and an ESA element 352 onboard the station 350. As before, directional control of the signals is one aspect of the invention requiring dynamic update rates. Should station 350 be stationary the math becomes less computationally intensive. Once station 350 is mobile, system 300 may use the additional variable to calculate the required angle for station 350 antenna to communicate with RP SAT ground link antenna 606.

In one embodiment, station antenna 352 is a single ESA directionally controllable via control signal and frequency agile to enable transmission and reception with a single array.

In another embodiment, station antenna 352 may be multiple antenna elements capable of broad angle reception and narrow beam transmission. In this manner, system 300 may tactically receive without revealing station positioning data 362 while continuing to accurately transmit the RP signal.

In one embodiment, station antenna may be directionally aligned with RP SAT position and track RP SAT position during the communication session. For example, system 300 may receive positioning data of each constellation of potential RP SATs configured with system 300 capabilities. This data may be updated on a regular basis to compensate for slight changes in RP SAT orbit and position. In one embodiment, RP SAT positioning data is updated monthly allowing system 300 to accurately direct station antenna 152 to the appropriate location in the sky to receive and transmit RP signal 142.

System 600 may employ the RP SAT transmission reception in the concept of a same band repeater. In this manner, station 150 may possess capability for a single frequency band transmission and reception. Here aircraft station 150 may be unaware the RP signal is not emanating from GEO SAT 130.

FIG. 7

Figure 7:
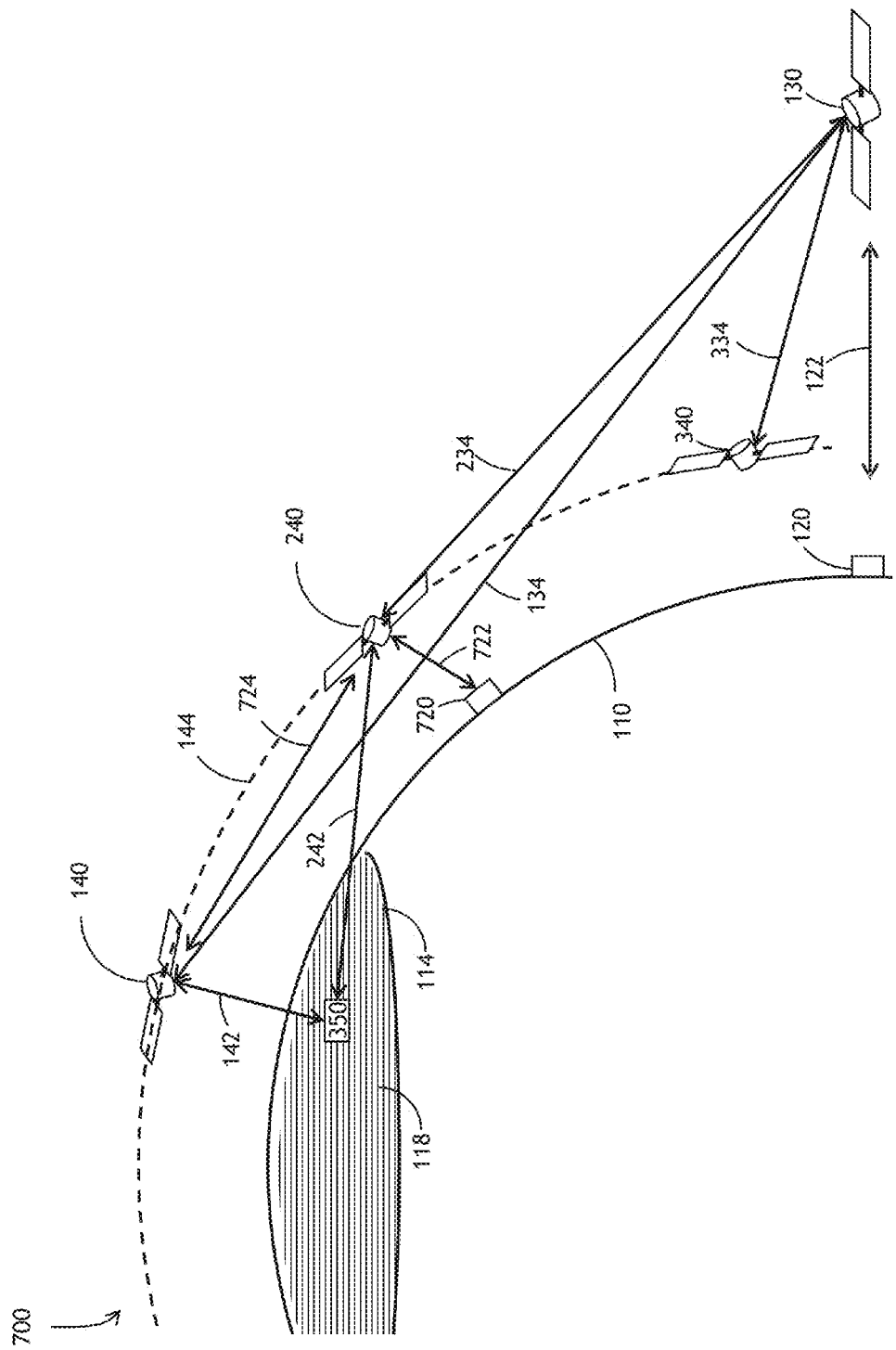
FIG. 7 a diagram of geometry associated with one embodiment of the present invention.

Referring to FIG. 7, a diagram of geometry associated with one embodiment of the present invention is shown. As the RP SAT 140 may be in line-of-sight communication with station 350, RP SAT 140 may proceed out of range with station 350. As second RP SAT 240 proceeds in the RP SAT orbit 144, it reaches a position, near approximately 60 north, where it maintains a simultaneous visibility with both the GEO SAT 130 via GEO signal 234 and the Polar Region 118 via RP signal 242.

System 300 may seamlessly transfer the RP signal in use by station 350 from first RP signal 142 to second RP signal 242. In this manner, station 350 is unaware there was a change in RP SAT from 140 to 240 from which the RP signal is being repeated.

One example of surface station 350 may include a ship operating on the surface of the water. For example, a commercial transport ship may employ embodiments of the present invention to provide broadband communications previously elusive in the Polar Regions. An additional example for surface station 350 may be a submarine operating under the surface of the water or under the ice. As long as the station 350 may be able to directionally control the antenna look angle toward the currently in use RP SAT 140, station 350 may maintain broadband communication.

Additional exemplary embodiments of system 300 may be specifically tailored to the vehicle to which system 300 may provide Polar SATCOM communication. For example, a submarine vehicle may include specifically configured antenna for reception and transmission of the RP signal. In addition, a variety of earth bound terminal or mobile radio devices may be functional onboard an aircraft, a mobile vehicle, a truck, a snow machine, a train and the like. In addition to mobile vehicles which may desire Polar SATCOM, fixed stations 350 may or part of a fixed station telemetry gathering station, environmental data collecting station and the like.

Each surface station 350 may possess a terminal capable of well-known communication with satellite vehicles. Such terminal may be best described in applicant's previous work embodied in U.S. Pat. No. 7,599,691 B1 entitled "System and method for internet access on a mobile platform" which is incorporated herein by reference in its entirety.

When the surface station 350 or aircraft station 150 is below 70 north latitude, the onboard terminal may be communicating directly with a GEO SAT 130. As the surface station 350 increases in latitude above 70 north/below 70 south, system 300 may direct the surface station antenna toward RP SAT 140 to begin to communicate via RP signal 140.

System 300 may comprise a control signal capable of directing each of the antennas configured for Polar SATCOM. Control signal may reside within RP SAT where system 300 may be sited onboard RP SAT. In additional embodiments, controller may reside in additional location and control signal may travel further to direct the antenna system for communication.

In one embodiment controller 380 may reside in the US in ground station 720. System 300 may receive the request for service from a plurality of locations including the station 350 as well as a remote supporter of station 350. For example, a polar surface team may operate on the polar surface and be supported by a support team located near 45 north. Each input including the station positioning data 362, the request for service 364 and the GEO SAT service type 366 may be initiated by the support team via control signal 722 724. In this manner, support team may communicate with controller 380 and controller carries out the steps to enable the polar team to communicate via RP SAT 140 and GEO SAT 130.

FIG. 8

Figure 8:
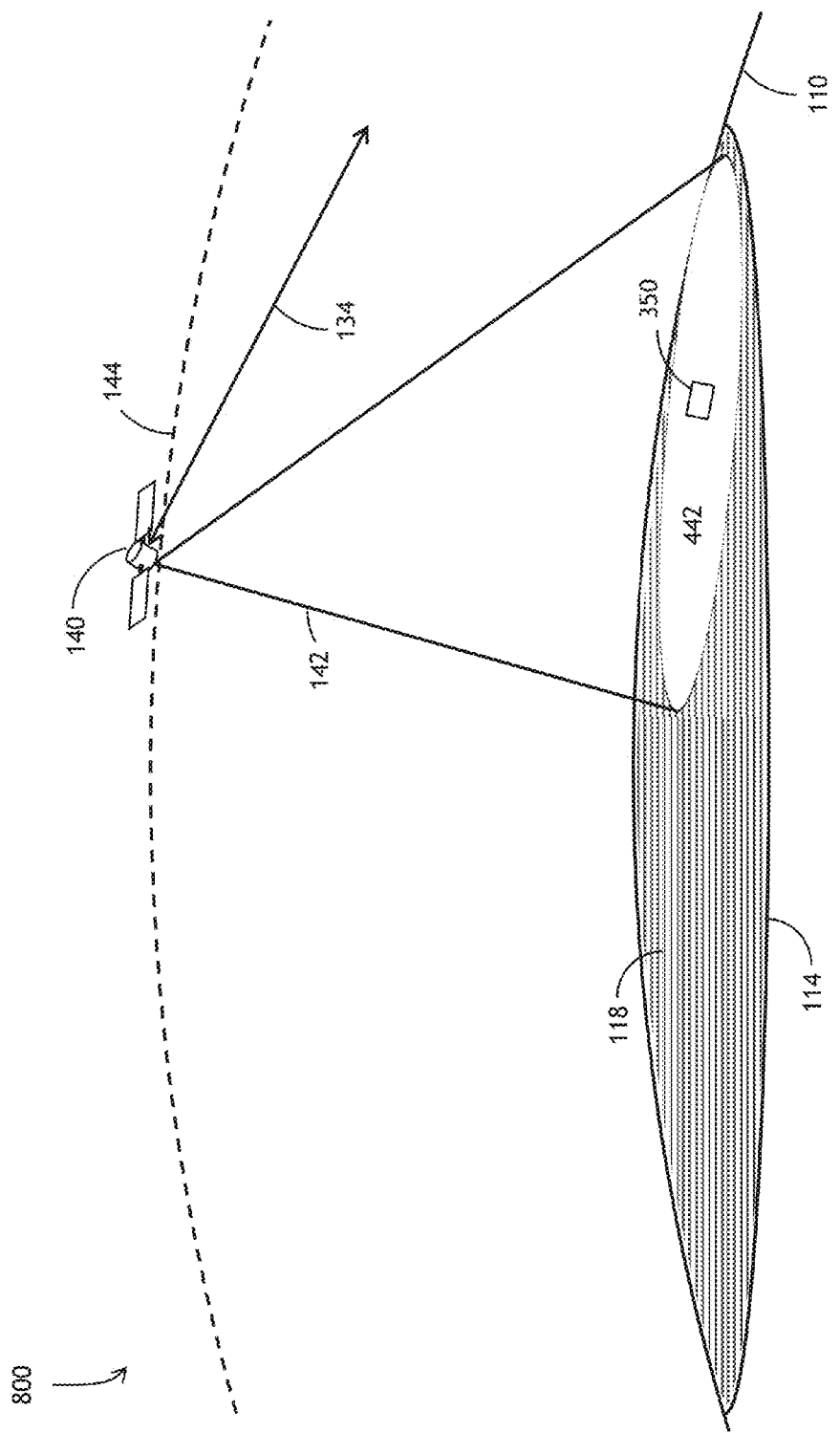
FIG. 8 is a diagram of geometry associated with one embodiment of the present invention.

Referring to FIG. 8, a diagram of geometry associated with one embodiment of the present invention is shown. Surface station 350 may communicate with an exemplary ground based network via RP signal 142. RP signal 142 may further comprise a conical shaped beam width enabling communication anywhere within service area 442. RP SAT ground link antenna 606 may directionally transmit receive within service area 442. The size of service area 442 may depend on a number of factors include RP SAT altitude, RP SAT ground link antenna structure, and the like.

FIG. 9

Figure 9:
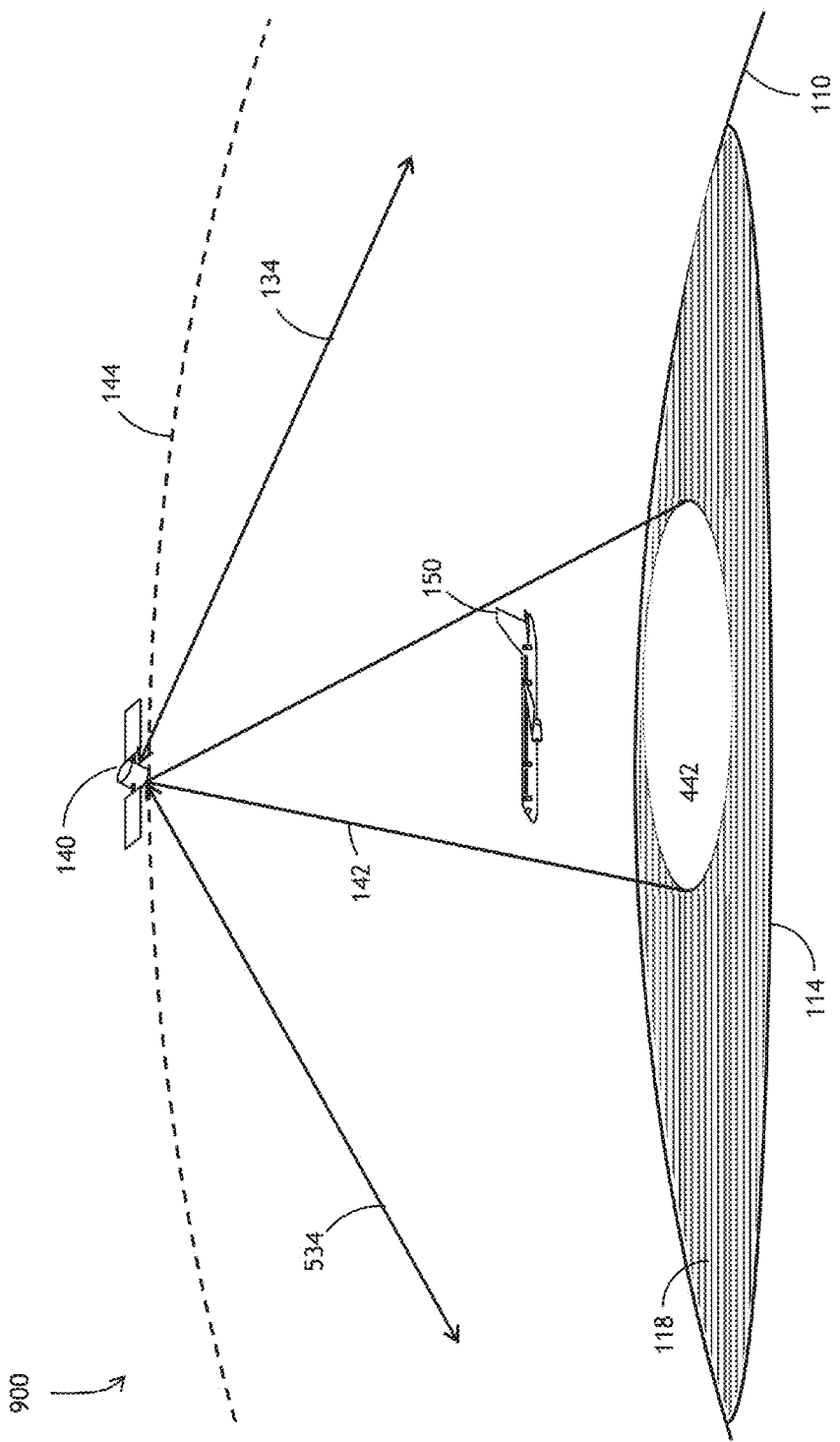
FIG. 9 is a diagram of geometry associated with one embodiment of the present invention.

Referring to FIG. 9, a diagram of geometry associated with one embodiment of the present invention is shown. As RP SAT continues in orbit, more than one GEO SAT may be within line-of-sight. System 300 may dynamically determine which of the GEO SATs enables the best communication source for station 150.

For example RP SAT 140 may be receiving the GEO signal 134 from a GEO SAT orbiting over Ecuador and the beam could be switched in a microsecond with no mechanical movement GEO signal 534 to a GEO SAT orbiting over the Sri Lanka. System 300 may direct the phased elements to communicate with the desired GEO SAT As RP SAT 140 continues in orbit, the line-of-sight POLAR SATCOM may be available throughout a 360 degree orbit via communication with a first GEO SAT 130 through n GEO SATs available for the desired content.

FIG. 10

Figure 10:
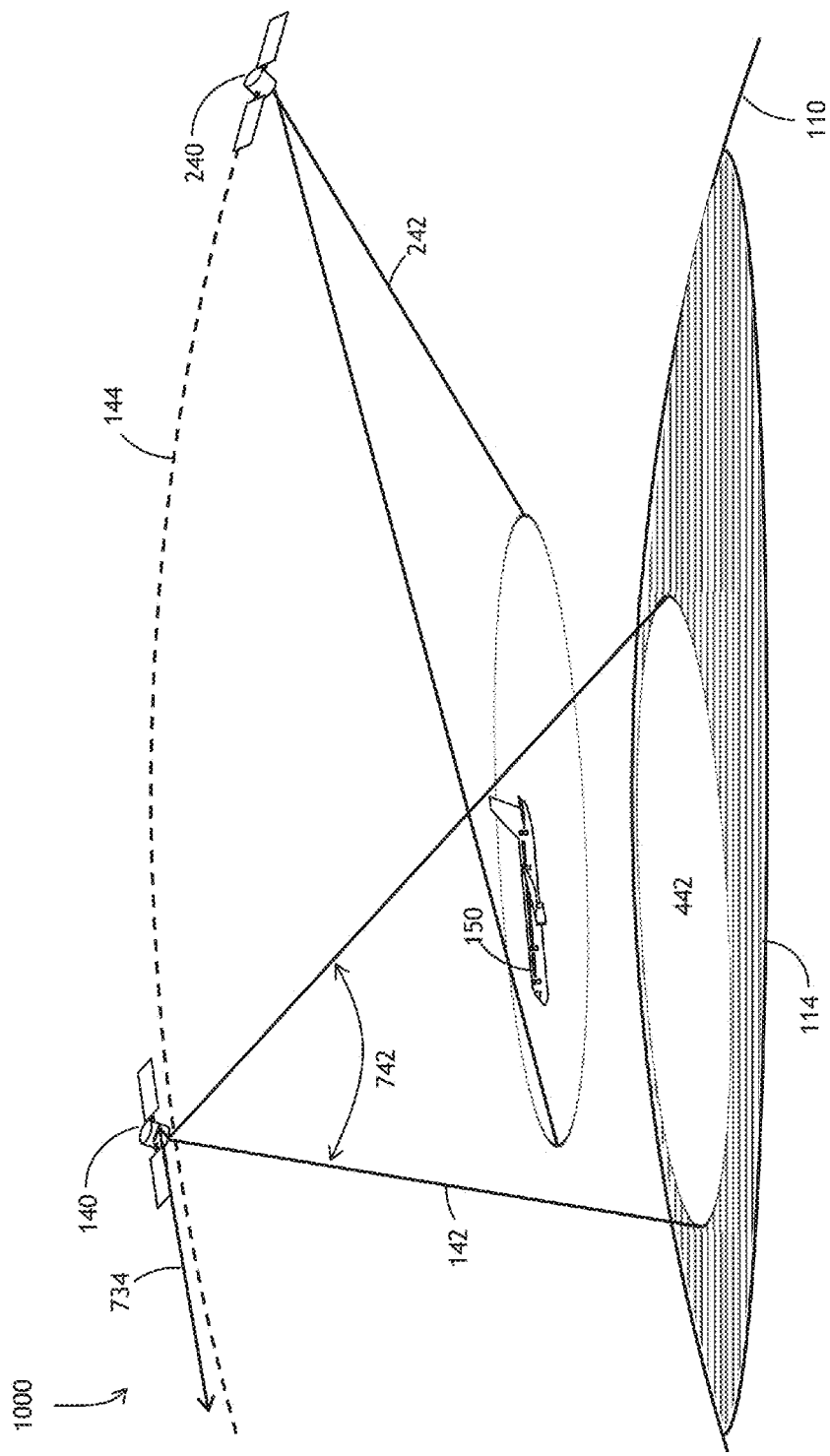
FIG. 10 is a diagram of geometry associated with one embodiment of the present invention.

Referring to FIG. 10, a diagram of geometry associated with one embodiment of the present invention is shown. As one RP SAT 140 continues in its orbit, it may reach a position where is no longer maintains line of sight with both a GEO SAT and the station within the Polar Region. At this point a second RP SAT 240 may assume the repeating duties between the Polar Region station and the GEO SAT.

Width 742 of RP signal may be variable based on a plurality of factors. Altitude of the RP SAT may be one factor as well as a desired power for ground coverage. A wider beam 742 may produce lesser power as RP signal reaches the station while a narrower beam may produce a greater power reaching the station 150. With greater power reaching station 150, a smaller station antenna 152 may be required for successful communication.

FIG. 11

Figure 11:
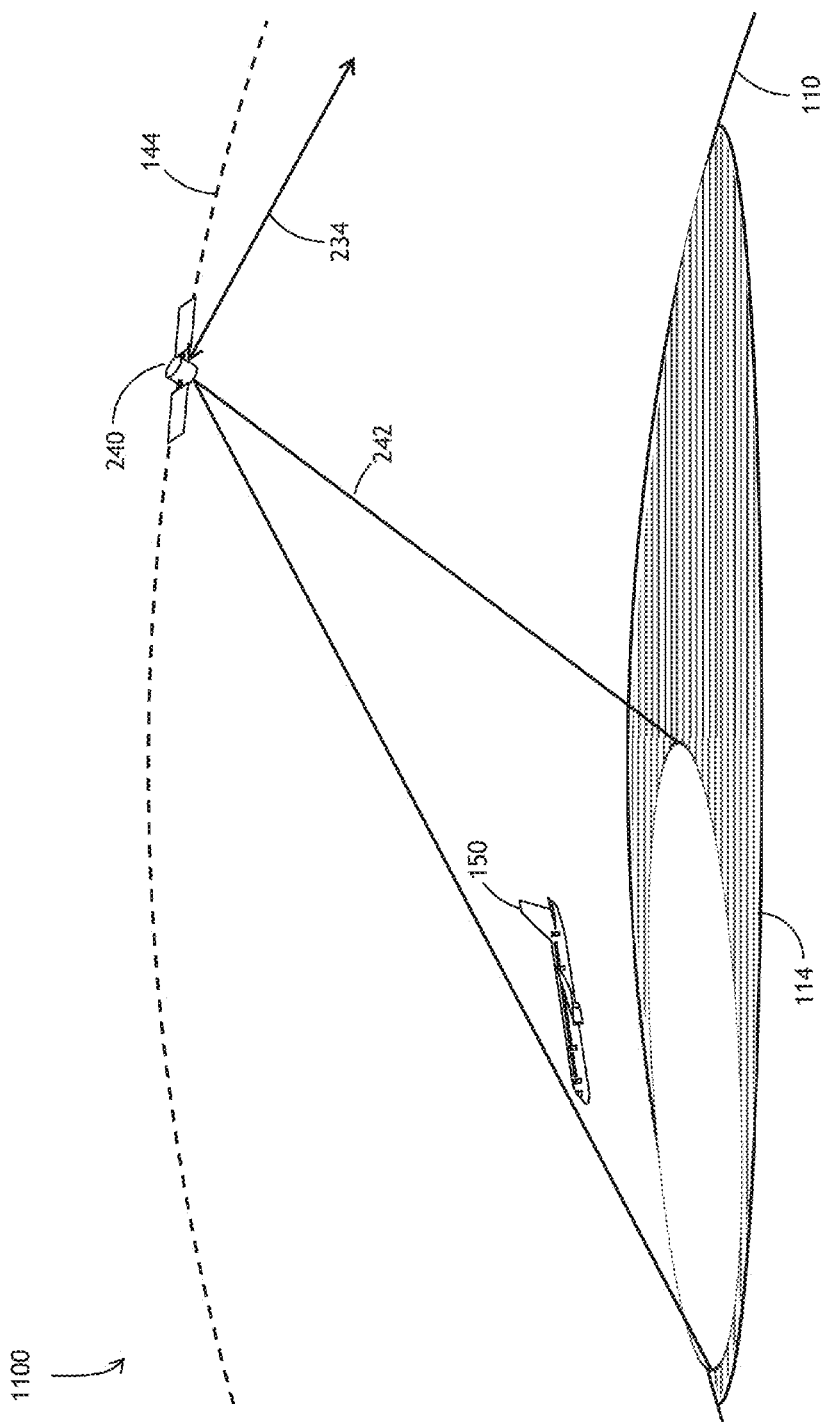
FIG. 11 is a diagram of geometry associated with one embodiment of the present invention.

Referring to FIG. 11, a diagram of geometry associated with one embodiment of the present invention is shown. Once the first RP SAT 140 is below the horizon of station 150, second RP SAT 240 may assume the full Polar SATCOM duties offering uninterrupted communications to station 150.

FIG. 12

Figure 12:
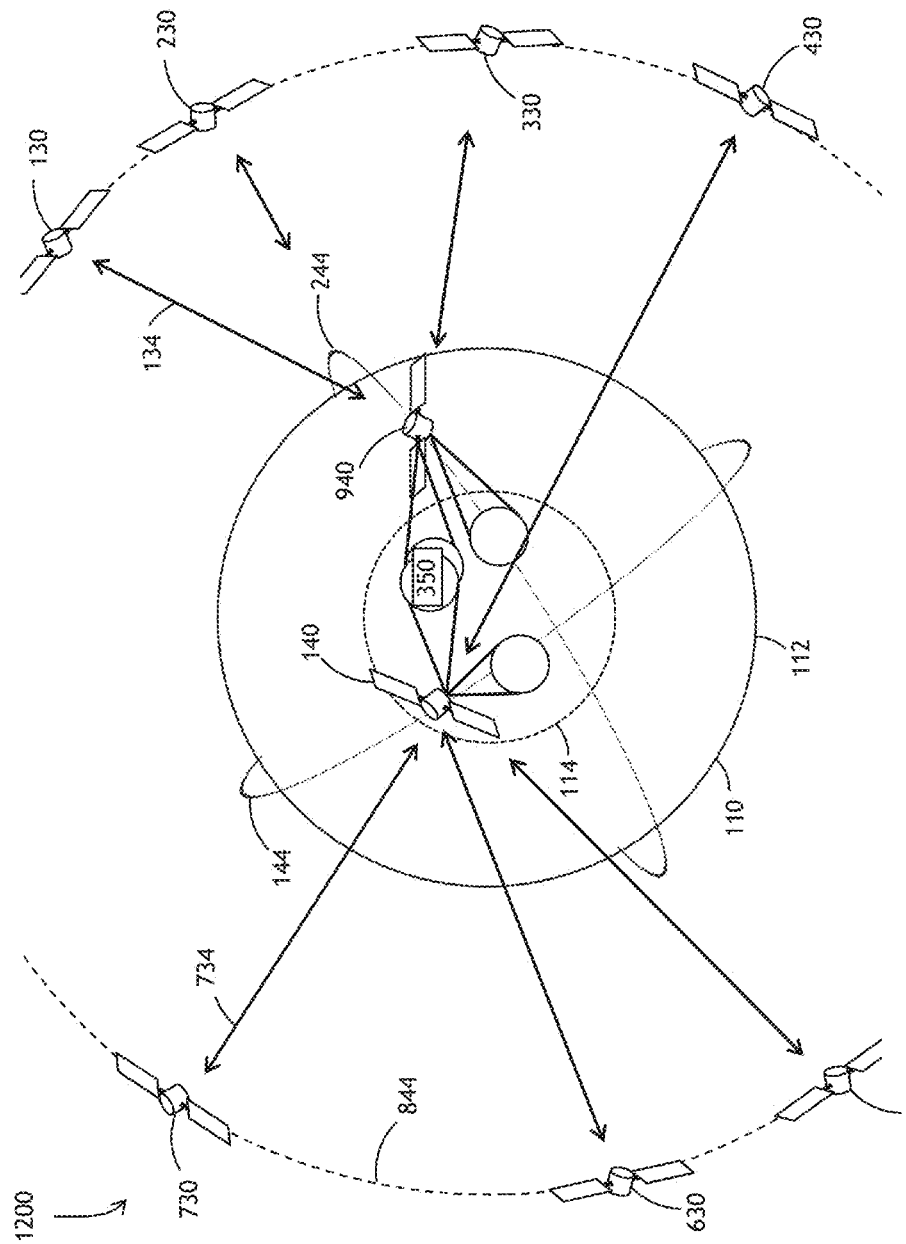
FIG. 12 is a polar view of geometry associated with one embodiment of the present invention.

Referring to FIG. 12, a polar view of geometry associated with one embodiment of the present invention is shown. Embodiments of the present invention may provide dynamic selection of a GEO SAT n and associated GEO signal. For example, station 350 may request a broadband video signal from a first constellation of GEO SATs including GEO SAT 730. As one of the GEO SATs becomes more distant from the RP SAT 140, system 300 may dynamically select a second GEO SAT 430 from which to communicate via the broadband video signal. System 300 may continue this process indefinitely providing a consistent signal from at least one of the GEO SATs within the first constellation via at least one RP SAT from a plurality of constellations.

Embodiments of the present invention may further provide for simultaneous selection of multiple GEO signals from multiple GEO constellations. For example, station 350 may request the broadband video signal from the first satellite constellation. During the repeating of the broadband video signal, station 350 may further request a broadband data signal from a second constellation of GEO SATs. System 300 may direct antenna elements onboard RP SAT as well as antenna elements onboard station 350 to simultaneously provide the requested conduits for the broadband data signal and the broadband video signal.

Alternatively, system 300 may determine a priority for which content may be desired by a user at station 350 and dynamically alternate between signals from the first GEO constellation and signals from the second GEO constellation.

In addition, the plurality of signals received at station 350 need not be repeated by a single RP SAT 140. Station 350 may communicate via signals from the first GEO constellation via a first RP SAT 140 and signals from the second GEO constellation via a second RP SAT 940 in a second constellation. In this manner, system 300 may serve station 350 150 with a plurality of signals from a plurality of constellations via a plurality of RP SATs.

Some satellite constellations suitable for RP SATs 140 may possess a sufficient number of SATs to enable system 300 to continuously provide service to the Polar Regions. For example, one satellite constellation may possess six orbital planes comprising 11 LEO SATs per plane. Should system 500 be operational on just one orbital plane of 11 SATs, system 300 may enable a first level of service. Should system 300 be operational on two orbital planes of 22 SATs, system 300 may realize a second, and more robust, level of service.

In one embodiment, system 300 is operational on one specific orbital plane of desired coverage area. For example, an orbital plane approximating 90 west/90 east longitudes with associated SATs configured may comprise a sufficient desirable coverage area of service for system 300.

In one embodiment, RP SAT is selected based on a plurality of factors including, but not limited to: visibility of a remote region, visibility of the Polar Region, altitude, speed and the like. There are a number types and classes of satellites including traditional SATs and "Micro" SATs available for system 300 use. In all cases, system 300 may make no distinction on which SAT is the RP SAT.

In addition, embodiments of the present invention may repeat a positioning signal to stations desiring such positioning information. For example, controller 380 may direct RP SAT GEO link antenna to receive a positioning signal from a positioning SAT. Controller 380 may then direct RP SAT ground link antenna toward the station requesting access to the positioning signal. In addition, as controller 380 receives location information from both station 350 and RP SAT 140, controller may apply a correction to the positioning signal to configure the positioning signal for proper use by positioning receivers onboard station 350. In this manner, station 350 may be able to receive a desirable positioning signal inaccessible without system 300.

In one embodiment, system 300 may be specifically configured for repeating of a positioning GEO signal. Each RP SAT may also be implement Geo location transmit waveforms, allowing station 150 350 receivers capable of multiple receive channels to demodulate data and derive timing to determine GEO position. Exemplary positioning waveforms may uniquely use higher RF bands (Ku, through W band) facilitating substantially greater position location accuracy than traditional GPS.

System 300 may reside onboard a mobile station desirous of remote SATCOM. A controller 380 onboard the mobile system may send directional command signals to RP SAT antennas and station antennas to provide the aligned communications conduit. The requester onboard the mobile station may be required to wait a period of time before a configured RP SAT 140 may become visible overhead.

In other embodiments, system 300 resides in a fixed ground station in communication with the system 300 elements. A processor capable of system 300 processing requirements may be too heavy or require too much power to place aboard RP SAT. In this manner, system 300 controller may command antenna elements to direct beam steering to the appropriate sources of signals to effect desired communication.

FIG. 13

Figure 13:
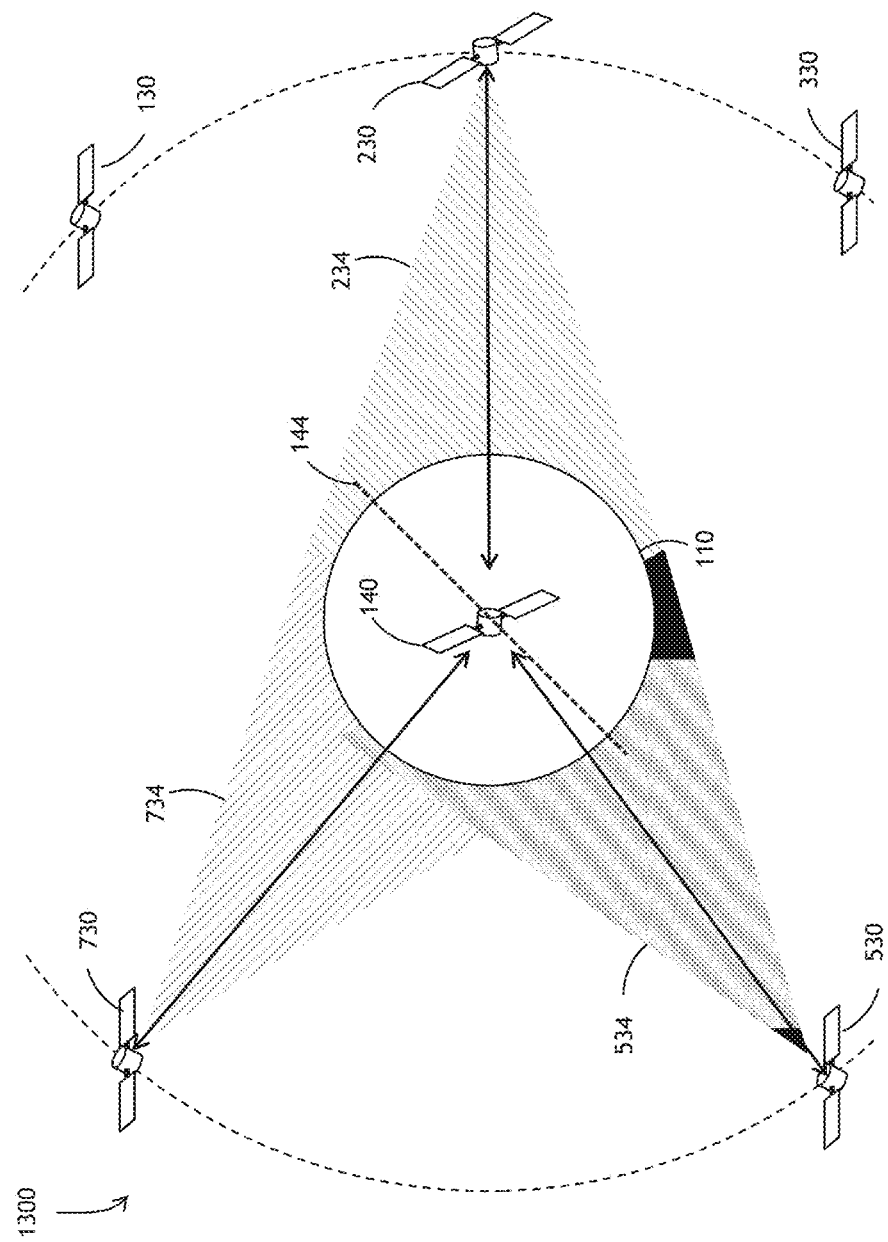
FIG. 13 is a polar view of geometry associated with one embodiment of the present invention.

Referring to FIG. 13, a polar view of geometry associated with one embodiment of the present invention is shown. Global overscan of GEO signals 234 534 734 may provide the world wide signals available for RP SAT to repeat to near earth stations 150 350.

It is further contemplated herein; embodiments of the present invention may operate to effect communication with stations located not only in the Polar Regions but throughout the world. For example, a station unable to maintain direct line-of-sight with a GEO SAT 130 may function within the scope of the present invention receiving the repeated signal from the RP SATs described herein.

For example, a station 350 located on the south side of a mountain in Argentina may not have adequate line-of-sight with at least one GEO SAT and therefore, be unable to directly communicate via the GEO signal 134. Similarly, an apartment located on the north side of a building in central Iowa may not have adequate line-of-sight to at least one GEO SAT. These examples of stations with limited line-of-sight with a GEO SAT may, however, be able to communicate via the repeated signal (transparent to the station in frequency and bandwidth, only differing in direction of reception) and function as though line-of-sight is available.

In other situations, where the station 350 may have some or temporary adequate line-of-sight with the GEO SAT, embodiments of the present invention may differentiate between the direct GEO signal 134 and the RP signal 142 in order to negate interference between the two.

In other embodiments of the present invention, a location based power management scheme may function to enhance system capabilities. For example, system 300 may power itself off when not in use (e.g., above 70 south northbound and below 70 north) but operational during desired times in the requested locations. In one embodiment, system 300 employs a power management system to power down unless specifically requested by a subscriber. In this manner, system 300 may conserve power onboard the RP SAT on which system 500 is mounted an only require power when necessary.

In some embodiments, system 300 may reside on RP SATs in possession of excess power when flying over remote areas. For example, one constellation of RP SATs may power down some communications over the Polar Regions to prevent interference with other SATs using similar frequencies. System 300 may capitalize on this excess unused RP SAT onboard power source and not require additional RP SAT power capabilities than are originally required onboard the desired RP SAT.

In another embodiment, system 300 may request increased power from RP SAT power sources during times and location of peak operation. For example, system 300 may be off for a period of time conserving power onboard RP SAT. At a peak period of communication, system 300 may request additional power resources or a power surge from RP SAT to effect the desired necessary communications.

FIG. 14

Figure 14:
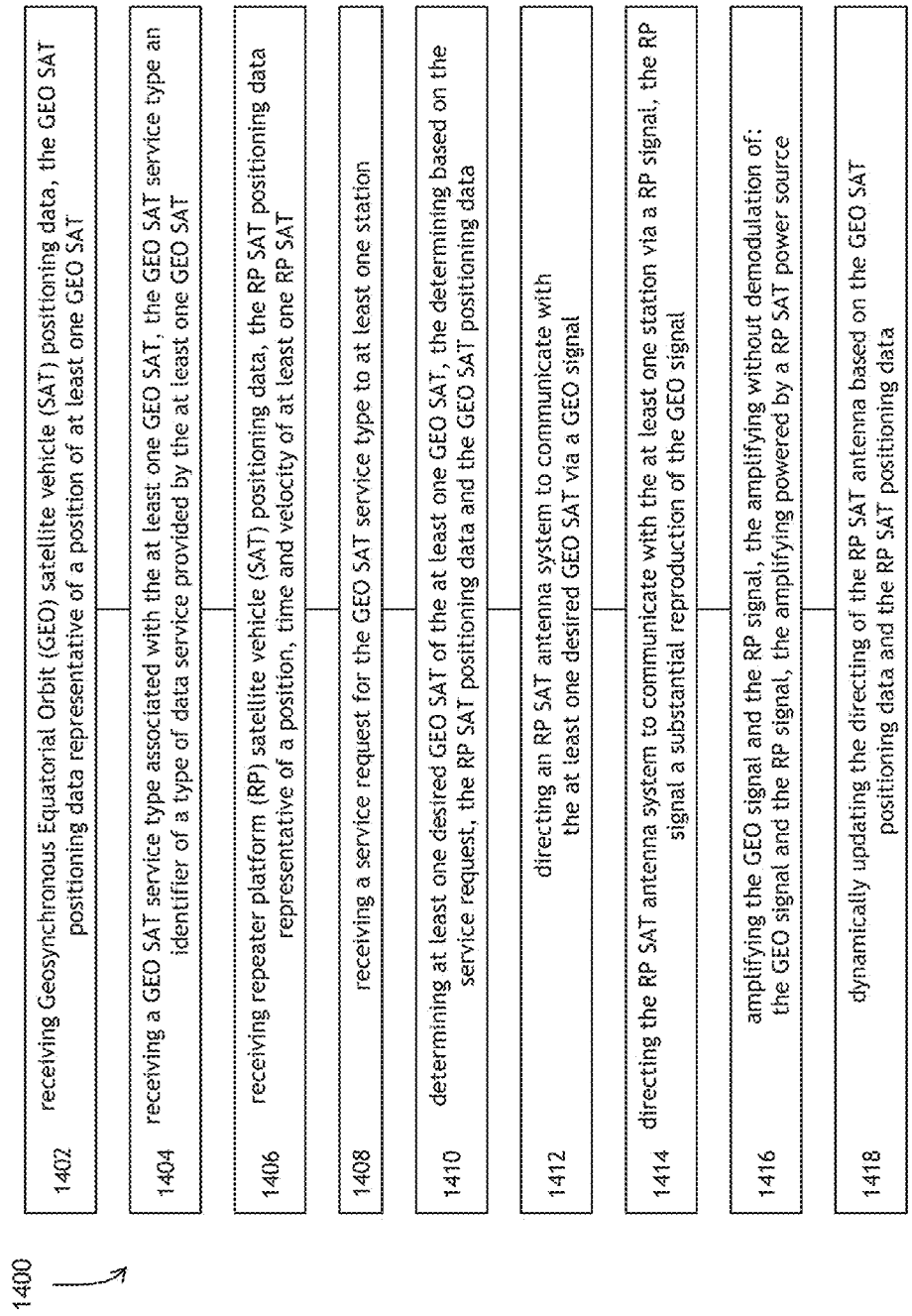
FIG. 14 is a flowchart for a method for polar communication in accordance with one embodiment of the present invention.

Referring to FIG. 14, a flowchart for a method for polar communication in accordance with one embodiment of the present invention is shown. Method 1400 may begin at step 1402, with receiving Geosynchronous Equatorial Orbit (GEO) satellite vehicle (SAT) positioning data, the GEO SAT positioning data representative of a position of at least one GEO SAT; and at step 1404, receiving a GEO SAT service type associated with the at least one GEO SAT, the GEO SAT service type an identifier of a type of data service provided by the at least one GEO SAT; and at step 1406, receiving repeater platform (RP) satellite vehicle (SAT) positioning data, the RP SAT positioning data representative of a position, time and velocity of at least one RP SAT; and at step 1408, receiving a service request for the GEO SAT service type to at least one station; and at step 1410, determining at least one desired GEO SAT of the at least one GEO SAT, the determining based on the service request, the RP SAT positioning data and the GEO SAT positioning data; and at step 1412, directing an RP SAT antenna system to communicate with the at least one desired GEO SAT via a GEO signal; and at step 1414, directing the RP SAT antenna system to communicate with the at least one station via a RP signal, the RP signal a substantial reproduction of the GEO signal; and at step 1416, amplifying the GEO signal and the RP signal, the amplifying without demodulation of: the GEO signal and the RP signal, the amplifying powered by a RP SAT power source; and at step 1418 method 1400 may be complete with dynamically updating the directing of the RP SAT antenna system based on the GEO SAT positioning data and the RP SAT positioning data.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method for communication relay via a repeater platform satellite vehicle, comprising:
  receiving Geosynchronous Equatorial Orbit (GEO) satellite vehicle (SAT) positioning data, the GEO SAT positioning data representative of a position of at least one GEO SAT, the GEO SAT in a GEO orbit;
  receiving a GEO SAT service type associated with the at least one GEO SAT, the GEO SAT service type an identifier of a type of data service provided by the at least one GEO SAT;
  receiving repeater platform (RP) satellite vehicle (SAT) positioning data, the RP SAT positioning data representative of a position, time and velocity of at least one RP SAT, the RP SAT in an orbit of smaller radius than the GEO orbit;
  receiving a service request for the GEO SAT service type to at least one station, the service request including station positioning data representative of a position and velocity of the station;
  determining at least one desired GEO SAT of the at least one GEO SAT, the determining based on the service request, the RP SAT positioning data and the GEO SAT positioning data;
  determining at least one desired RP SAT of the at least one RP SAT, the determining based on the service request, the GEO SAT positioning data, and the RP SAT positioning data;
  directing at least one RP SAT GEO link antenna to communicate via a GEO signal between the RP SAT GEO link antenna and the at least one desired GEO SAT, the directing based on the RP SAT positioning data and the GEO SAT positioning data, the RP SAT GEO link antenna located on the at least one desired RP SAT;
  directing at least one RP SAT ground link antenna to communicate via at least one RP signal between the RP SAT ground link antenna and the at least one station, the directing based on the RP SAT positioning data and the station positioning data, the RP SAT ground link antenna located on the at least one desired RP SAT;
  directing at least one station antenna to communicate via the at least one RP signal between the station antenna and the at least one RP SAT ground link antenna, the directing based on the RP SAT positioning data and the station positioning data, the at least one station antenna located proximal to the at least one station;
  amplifying the GEO signal and the RP signal, the amplifying without demodulation of: the GEO signal and the RP signal, the amplifying powered by a RP SAT power source; and
  dynamically updating the directing of the RP SAT GEO link antenna, the RP SAT GEO ground link antenna and the at least one station antenna based on the GEO SAT positioning data, the station positioning data, and the RP SAT positioning data.

2. The method for communication relay via a repeater platform satellite vehicle of claim 1, wherein the GEO SAT is at least one of a plurality of GEO SATs in communication with at least one ground station and the RP SAT is at least one of: a Low Earth Orbit (LEO) SAT, a Medium Earth Orbit (MEO) SAT, a Highly Elliptical Orbit (HEO) SAT and a SAT more distant from the earth than the LEO SAT.

3. The method for communication relay via a repeater platform satellite vehicle of claim 1, wherein the RP SAT antenna system and a station antenna are an Electronically Steerable Array (ESA) antenna.

4. The method for communication relay via a repeater platform satellite vehicle of claim 1, wherein one of the at least one desired GEO SAT is configured for one of: internet data, streaming data and positioning data and is of a different service type from another of the at least one desired GEO SAT.

5. The method for communication relay via a repeater platform satellite vehicle of claim 1, wherein the RP SAT GEO link antenna and the RP SAT ground link antenna are a single ESA configured for multiple beam transmission and reception between the RP SAT and the GEO SAT and between the RP SAT and the station.

6. The method for communication relay via a repeater platform satellite vehicle of claim 1, wherein directing the at least one RP SAT GEO link and ground link antennas further comprises electrically steering a beam in at least one of: reception and transmission to receive and transmit at least one of: the GEO signal and the RP signal.

7. The method for communication relay via a repeater platform satellite vehicle of claim 1, wherein dynamically updating the directing of the RP SAT antenna system, based on the GEO SAT positioning data further comprises receiving updated positioning data from the at least one GEO SAT and the at least one RP SAT.

8. The method for communication relay via a repeater platform satellite vehicle of claim 1, wherein directing the RP SAT antenna system and further comprises a control signal received from a remote location via at least one of: wired, optical and wireless transmission.

9. A system for communication relay via a repeater platform satellite vehicle, comprising:
  at least one Repeater Platform (RP) Satellite Vehicle (SAT) antenna system configured for bidirectional communication with at least one Geosynchronous Equatorial Orbit (GEO) Satellite Vehicle (SAT), the at least one GEO SAT in a GEO orbit, the bidirectional communication via at least one GEO signal, the RP SAT antenna system located onboard a RP SAT, the at least one GEO signal between the at least one RP SAT GEO link antenna and the at least one GEO SAT, the RP SAT antenna system further configured for bidirectional communication with at least one station, the at least one station not within adequate line-of-sight of the at least one GEO SAT, the bidirectional communication via at least one RP signal, the at least one RP signal a substantial reproduction of the at least one GEO signal;

a RP SAT amplifier system, the RP SAT amplifier system receiving power from the RP SAT, the RP SAT amplifier system configured for amplifying the at least one GEO signal and the at least one RP signal, the amplifying without demodulation of: the at least one GEO signal and the at least one RP signal, the RP SAT amplifier system located onboard an RP SAT, the RP SAT in an orbit of smaller radius than the GEO orbit;

a controller configured for:
receiving GEO SAT positioning data, the GEO SAT positioning data representative of a position of the at least one GEO SAT;
receiving a GEO SAT service type associated with the at least one GEO SAT, the GEO SAT service type an identifier of a type of data service provided by the at least one GEO SAT;
receiving RP SAT positioning data, the RP SAT positioning data representative of a position and velocity of at least one RP SAT;
receiving a service request for the GEO SAT service type to at least one station, the service request including station positioning data representative of a position and velocity of the station;
determining at least one desired GEO SAT of the at least one GEO SAT, the determining based on the service request, the RP SAT positioning data and the GEO SAT positioning data;
determining at least one desired RP SAT of the at least one RP SAT, the determining based on the service request, the GEO SAT positioning data, and the RP SAT positioning data;
directing the RP SAT antenna system to communicate via the at least one GEO signal, the directing based on the RP SAT positioning data and the GEO SAT positioning data;
directing the RP SAT antenna system to communicate via the at least one RP signal between the RP SAT ground link antenna and at least one station, the directing based on the RP SAT positioning data and the station positioning data;
directing at least one station antenna to communicate via the at least one RP signal between the station antenna and the at least one RP SAT ground link antenna, the directing based on the RP SAT positioning data and the station positioning data, the at least one station antenna located proximal to the at least one station;
dynamically updating the directing of the RP SAT antenna system and the at least one station antenna based on the GEO SAT positioning data and the RP SAT positioning data; and a communication link between the controller and: the RP SAT antenna system, the communication link for receiving signals representative of positioning data from: the at least one GEO SAT, the at least one RP SAT and the station, the communication link for sending signals representative of directing the RP SAT antenna system to communicate with the GEO SAT and with the station.

10. The system for communication relay via a repeater platform satellite vehicle of claim 9, wherein the communications link and the RP signal are the same signal.

11. The system for communication relay via a repeater platform satellite vehicle of claim 9, wherein the communications link comprises a wireless signal external to the GEO signal.

12. The system for communication relay via a repeater platform satellite vehicle of claim 9, wherein the GEO SAT is at least one of a plurality of GEO SATs in communication with at least one ground station.

13. The system for communication relay via a repeater platform satellite vehicle of claim 9, wherein the RP SAT antenna system and the station antenna are an Electronically Steerable Array (ESA) antenna.

14. The system for communication relay via a repeater platform satellite vehicle of claim 9, wherein one of the at least one desired GEO SAT is configured for one of: internet data, streaming data and positioning data and is of a different service type from another of the at least one desired GEO SAT.

15. The system for communication relay via a repeater platform satellite vehicle of claim 9, wherein the RP SAT antenna system is a single ESA configured for multiple beam transmission and reception between the RP SAT and the GEO SAT and between the RP SAT and the station.

16. The system for communication relay via a repeater platform satellite vehicle of claim 9, wherein directing the RP SAT system further comprises electrically steering a beam in at least one of: reception and transmission to receive and transmit at least one of: the GEO signal and the RP signal.

17. The system for communication relay via a repeater platform satellite vehicle of claim 9, wherein dynamically updating the directing of the at least one RP SAT antenna system and the at least one station antenna based on the GEO SAT positioning data further comprises receiving updated positioning data from each of: the at least one GEO SAT, the at least one RP SAT and the station.

18. The system for communication relay via a repeater platform satellite vehicle of claim 9, wherein directing the RP SAT antenna system and the at least one station antenna further comprises a control signal received from a remote location via at least one of: wired, optical and wireless transmission.

19. A non-transitory computer readable medium having non-transitory computer readable program code embodied therein for communication relay via a repeater platform satellite vehicle, the computer readable program code comprising instructions which, when executed by a computer device or processor, perform and direct the steps of:
receiving Geosynchronous Equatorial Orbit (GEO) satellite vehicle (SAT) positioning data, the GEO SAT positioning data representative of a position of at least one GEO SAT in a GEO orbit;
receiving a GEO SAT service type associated with the at least one GEO SAT, the GEO SAT service type an identifier of a type of data service provided by the at least one GEO SAT;
receiving repeater platform (RP) satellite vehicle (SAT) positioning data, the RP SAT positioning data representative of a position, time and velocity of at least one RP SAT, the at least one RP SAT in an orbit of smaller radius than the GEO orbit;
receiving a service request for the GEO SAT service type to at least one station, the service request including station positioning data representative of a position and velocity of the station;

determining at least one desired GEO SAT of the at least one GEO SAT, the determining based on the service request, the RP SAT positioning data and the GEO SAT positioning data;

determining at least one desired RP SAT of the at least one RP SAT, the determining based on the service request, the GEO SAT positioning data, and the RP SAT positioning data;

directing an RP SAT antenna system to communicate with the at least one desired GEO SAT via a GEO signal, the directing based on the RP SAT positioning data and the GEO SAT positioning data;

directing the RP SAT antenna system to communicate with the at least one station via a RP signal, the RP signal a substantial reproduction of the GEO signal, the directing based on the RP SAT positioning data and the station positioning data;

directing at least one station antenna to communicate via the at least one RP signal between the station antenna and the RP SAT antenna system, the directing based on the RP SAT positioning data and the station positioning data, the at least one station antenna located proximal to the at least one station;

amplifying the GEO signal and the RP signal, the amplifying without demodulation of: the GEO signal and the RP signal, the amplifying powered by a RP SAT power source;

dynamically updating the directing of the RP SAT antenna system and the at least one station antenna based on the station positioning data, the GEO SAT positioning data and the RP SAT positioning data.

20. A method for communication relay via a repeater platform satellite vehicle, comprising:

means for receiving Geosynchronous Equatorial Orbit (GEO) satellite vehicle (SAT) positioning data, the GEO SAT positioning data representative of a position of at least one GEO SAT;

means for receiving a GEO SAT service type associated with the at least one GEO SAT, the GEO SAT service type an identifier of a type of data service provided by the at least one GEO SAT;

means for receiving repeater platform (RP) satellite vehicle (SAT) positioning data, the RP SAT positioning data representative of a position, time and velocity of at least one RP SAT;

means for receiving a service request for the GEO SAT service type to at least one station;

means for determining at least one desired GEO SAT of the at least one GEO SAT;

means for determining at least one desired RP SAT of the at least one RP SAT;

means for directing an RP SAT antenna system to communicate with the at least one desired GEO SAT;

means for directing the RP SAT antenna system to communicate with the at least one station, the RP signal a substantial reproduction of the GEO signal;

means for directing a station antenna to communicate with the RP SAT antenna system;

means for amplifying the GEO signal and the RP signal, the amplifying without demodulation of: the GEO signal and the RP signal;

means for dynamically updating the directing of the station antenna and the RP SAT antenna system.

\* \* \* \* \*